United States Patent
Hwang

(10) Patent No.: US 12,395,267 B2
(45) Date of Patent: Aug. 19, 2025

(54) CYCLIC REDUNDANCY CHECK SYSTEM AND CYCLIC REDUNDANCY CHECK METHOD

(71) Applicant: SAMSUNG ELECTRONICS CO., LTD., Suwon-si (KR)

(72) Inventor: Jinwoo Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/594,878

(22) Filed: Mar. 4, 2024

(65) Prior Publication Data
US 2024/0313889 A1 Sep. 19, 2024

(30) Foreign Application Priority Data
Mar. 13, 2023 (KR) .................. 10-2023-0032616

(51) Int. Cl.
*H04L 1/00* (2006.01)
*G06F 11/10* (2006.01)

(52) U.S. Cl.
CPC ........ *H04L 1/0061* (2013.01); *G06F 11/1004* (2013.01)

(58) Field of Classification Search
CPC .. H04L 1/0061; G06F 11/1004; H03M 13/09; G11C 29/42; H04N 21/4382
See application file for complete search history.

(56) References Cited

U.S. PATENT DOCUMENTS

| | | | |
|---|---|---|---|
| 7,426,679 B2 | 9/2008 | Gorshe | |
| 8,225,187 B1 | 7/2012 | Schultz et al. | |
| 9,047,082 B2 | 6/2015 | Gopal et al. | |
| 9,071,275 B2 * | 6/2015 | Zhang | H03M 13/091 |
| 10,812,103 B1 | 10/2020 | Bairi | |
| 11,048,579 B2 | 6/2021 | King et al. | |
| 2007/0016842 A1 | 1/2007 | Samuel et al. | |
| 2020/0293400 A1 * | 9/2020 | Steiner | H03M 13/2942 |

FOREIGN PATENT DOCUMENTS

KR 10-0886297 B1 3/2009

OTHER PUBLICATIONS

Communication issued on Jul. 18, 2024 by the European Patent Office for European Patent Application No. 24163238.9.

* cited by examiner

*Primary Examiner* — Thien Nguyen
(74) *Attorney, Agent, or Firm* — Sughrue Mion, PLLC

(57) ABSTRACT

A cyclic redundancy check (CRC) system and a CRC method are provided. The CRC system includes a data folding processing circuit and a CRC processing circuit. The data folding processing circuit includes a first bit fold circuit configured to fold first input data into first fold data, a second bit fold circuit configured to fold second input data into second fold data, and a stream fold circuit configured to generate first fold streaming data based on the first fold data and the second fold data. The CRC processing circuit includes a first flip-flop configured to receive and store first dividend data of a first cycle, a second flip-flop configured to receive and store the first fold streaming data of the first cycle, and a CRC logic configured to perform a CRC operation on the first dividend data and the first fold streaming data.

20 Claims, 24 Drawing Sheets

FIG. 10A

| Group | Folded 4 bit-stream | INTEGER GREATER THAN OR EQUAL TO 0 AND LESS THAN OR EQUAL TO 255 |||||||||||||||
|---|---|---|---|---|---|---|---|---|---|---|---|---|---|---|---|---|
| 0 | 0000 | 0 | 17 | 34 | 51 | 68 | 85 | 102 | 119 | 136 | 153 | 170 | 187 | 204 | 221 | 238 | 255 |
| 1 | 0001 | 1 | 16 | 35 | 50 | 69 | 84 | 103 | 118 | 137 | 152 | 171 | 186 | 205 | 220 | 239 | 254 |
| 2 | 0010 | 2 | 19 | 32 | 49 | 70 | 87 | 100 | 117 | 138 | 155 | 168 | 185 | 206 | 223 | 236 | 253 |
| 3 | 0011 | 3 | 18 | 33 | 48 | 71 | 86 | 101 | 116 | 139 | 154 | 169 | 184 | 207 | 222 | 237 | 252 |
| 4 | 0100 | 4 | 21 | 38 | 55 | 64 | 81 | 98 | 115 | 140 | 157 | 174 | 191 | 200 | 217 | 234 | 251 |
| 5 | 0101 | 5 | 20 | 39 | 54 | 65 | 80 | 99 | 114 | 141 | 156 | 175 | 190 | 201 | 216 | 235 | 250 |
| 6 | 0110 | 6 | 23 | 36 | 53 | 66 | 83 | 96 | 113 | 142 | 159 | 172 | 189 | 202 | 219 | 232 | 249 |
| 7 | 0111 | 7 | 22 | 37 | 52 | 67 | 82 | 97 | 112 | 143 | 158 | 173 | 188 | 203 | 218 | 233 | 248 |
| 8 | 1000 | 8 | 25 | 42 | 59 | 76 | 93 | 110 | 127 | 128 | 145 | 162 | 179 | 196 | 213 | 230 | 247 |
| 9 | 1001 | 9 | 24 | 43 | 58 | 77 | 92 | 111 | 126 | 129 | 144 | 163 | 178 | 197 | 212 | 231 | 246 |
| 10 | 1010 | 10 | 27 | 40 | 57 | 78 | 95 | 108 | 125 | 130 | 147 | 160 | 177 | 198 | 215 | 228 | 245 |
| 11 | 1011 | 11 | 26 | 41 | 56 | 79 | 94 | 109 | 124 | 131 | 146 | 161 | 176 | 199 | 214 | 229 | 244 |
| 12 | 1100 | 12 | 29 | 46 | 63 | 72 | 89 | 106 | 123 | 132 | 149 | 166 | 183 | 192 | 209 | 226 | 243 |
| 13 | 1101 | 13 | 28 | 47 | 62 | 73 | 88 | 107 | 122 | 133 | 148 | 167 | 182 | 193 | 208 | 227 | 242 |
| 14 | 1110 | 14 | 31 | 44 | 61 | 74 | 91 | 104 | 121 | 134 | 151 | 164 | 181 | 194 | 211 | 224 | 241 |
| 15 | 1111 | 15 | 30 | 45 | 60 | 75 | 90 | 105 | 120 | 135 | 150 | 165 | 180 | 195 | 210 | 225 | 240 |

FIG. 10B

| Group | Folded 4 bit-stream | INTEGER GREATER THAN OR EQUAL TO 0 AND LESS THAN OR EQUAL TO 255 | | | | | | | | | | | | | | |
|---|---|---|---|---|---|---|---|---|---|---|---|---|---|---|---|---|
| 0 | 0000 | 0 | 18 | 36 | 54 | 64 | 82 | 100 | 118 | 129 | 147 | 165 | 183 | 193 | 211 | 229 | 247 |
| 1 | 0001 | 1 | 19 | 37 | 55 | 65 | 83 | 101 | 119 | 128 | 146 | 164 | 182 | 192 | 210 | 228 | 246 |
| 2 | 0010 | 2 | 16 | 38 | 52 | 66 | 80 | 102 | 116 | 131 | 145 | 167 | 181 | 195 | 209 | 231 | 245 |
| 3 | 0011 | 3 | 17 | 39 | 53 | 67 | 81 | 103 | 117 | 130 | 144 | 166 | 180 | 194 | 208 | 230 | 244 |
| 4 | 0100 | 4 | 22 | 32 | 50 | 68 | 86 | 96 | 114 | 133 | 151 | 161 | 179 | 197 | 215 | 225 | 243 |
| 5 | 0101 | 5 | 23 | 33 | 51 | 69 | 87 | 97 | 115 | 132 | 150 | 160 | 178 | 196 | 214 | 224 | 242 |
| 6 | 0110 | 6 | 20 | 34 | 48 | 70 | 84 | 98 | 112 | 135 | 149 | 163 | 177 | 199 | 213 | 227 | 241 |
| 7 | 0111 | 7 | 21 | 35 | 49 | 71 | 85 | 99 | 113 | 134 | 148 | 162 | 176 | 198 | 212 | 226 | 240 |
| 8 | 1000 | 8 | 26 | 44 | 62 | 72 | 90 | 108 | 126 | 137 | 155 | 173 | 191 | 201 | 219 | 237 | 255 |
| 9 | 1001 | 9 | 27 | 45 | 63 | 73 | 91 | 109 | 127 | 136 | 154 | 172 | 190 | 200 | 218 | 236 | 254 |
| 10 | 1010 | 10 | 24 | 46 | 60 | 74 | 88 | 110 | 124 | 139 | 153 | 175 | 189 | 203 | 217 | 239 | 253 |
| 11 | 1011 | 11 | 25 | 47 | 61 | 75 | 89 | 111 | 125 | 138 | 152 | 174 | 188 | 202 | 216 | 238 | 252 |
| 12 | 1100 | 12 | 30 | 40 | 58 | 76 | 94 | 104 | 122 | 141 | 159 | 169 | 187 | 205 | 223 | 233 | 251 |
| 13 | 1101 | 13 | 31 | 41 | 59 | 77 | 95 | 105 | 123 | 140 | 158 | 168 | 186 | 204 | 222 | 232 | 250 |
| 14 | 1110 | 14 | 28 | 42 | 56 | 78 | 92 | 106 | 120 | 143 | 157 | 171 | 185 | 207 | 221 | 235 | 249 |
| 15 | 1111 | 15 | 29 | 43 | 57 | 79 | 93 | 107 | 121 | 142 | 156 | 170 | 184 | 206 | 220 | 234 | 248 |

FIG. 11

| Group number of Table | | | | | | | | | | | | | | | |
|---|---|---|---|---|---|---|---|---|---|---|---|---|---|---|---|
| 0 | 3 | 6 | 5 | 4 | 7 | 2 | 1 | 9 | 10 | 15 | 12 | 13 | 14 | 11 | 8 |
| 1 | 2 | 7 | 4 | 5 | 6 | 3 | 0 | 8 | 11 | 14 | 13 | 12 | 15 | 10 | 9 |
| 2 | 1 | 4 | 7 | 6 | 5 | 0 | 3 | 11 | 8 | 13 | 14 | 15 | 12 | 9 | 10 |
| 3 | 0 | 5 | 6 | 7 | 4 | 1 | 2 | 10 | 9 | 12 | 15 | 14 | 13 | 8 | 11 |
| 4 | 7 | 2 | 1 | 0 | 3 | 6 | 5 | 13 | 14 | 11 | 8 | 9 | 10 | 15 | 12 |
| 5 | 6 | 3 | 0 | 1 | 2 | 7 | 4 | 12 | 15 | 10 | 9 | 8 | 11 | 14 | 13 |
| 6 | 5 | 0 | 3 | 2 | 1 | 4 | 7 | 15 | 12 | 9 | 10 | 11 | 8 | 13 | 14 |
| 7 | 4 | 1 | 2 | 3 | 0 | 5 | 6 | 14 | 13 | 8 | 11 | 10 | 9 | 12 | 15 |
| 8 | 11 | 14 | 13 | 12 | 15 | 10 | 9 | 1 | 2 | 7 | 4 | 5 | 6 | 3 | 0 |
| 9 | 10 | 15 | 12 | 13 | 14 | 11 | 8 | 0 | 3 | 6 | 5 | 4 | 7 | 2 | 1 |
| 10 | 9 | 12 | 15 | 14 | 13 | 8 | 11 | 3 | 0 | 5 | 6 | 7 | 4 | 1 | 2 |
| 11 | 8 | 13 | 14 | 15 | 12 | 9 | 10 | 2 | 1 | 4 | 7 | 6 | 5 | 0 | 3 |
| 12 | 15 | 10 | 9 | 8 | 11 | 14 | 13 | 5 | 6 | 3 | 0 | 1 | 2 | 7 | 4 |
| 13 | 14 | 11 | 8 | 9 | 10 | 15 | 12 | 4 | 7 | 2 | 1 | 0 | 3 | 6 | 5 |
| 14 | 13 | 8 | 11 | 10 | 9 | 12 | 15 | 7 | 4 | 1 | 2 | 3 | 0 | 5 | 6 |
| 15 | 12 | 9 | 10 | 11 | 8 | 13 | 14 | 6 | 5 | 0 | 3 | 2 | 1 | 4 | 7 |

NORMAL CASE

| d1 | 186 |
|---|---|

| | | [7] | [6] | [5] | [4] | [3] | [2] | [1] | [0] |
|---|---|---|---|---|---|---|---|---|---|
| d2 | 47 | 0 | 0 | 1 | 0 | 1 | 1 | 1 | 1 |
| fsd2 | 142 | 1 | 0 | 0 | 0 | 1 | 1 | 1 | 0 |
| re2 | 161 | 1 | 0 | 1 | 0 | 0 | 0 | 0 | 1 |

| | | | | | | | | | |
|---|---|---|---|---|---|---|---|---|---|
| d3 | 110 | 0 | 1 | 1 | 0 | 1 | 1 | 1 | 0 |
| fsd3 | 89 | 0 | 1 | 0 | 1 | 1 | 0 | 0 | 1 |
| re3 | 55 | 0 | 0 | 1 | 1 | 0 | 1 | 1 | 1 |

FIG. 14B bit position [3] ERROR CASE

| d1 | 186 |
|---|---|

| | | [7] | [6] | [5] | [4] | [3] | [2] | [1] | [0] |
|---|---|---|---|---|---|---|---|---|---|
| d2 | 47 | 0 | 0 | 1 | 0 | 1 | 1 | 1 | 1 |
| fsd2 | 134 | 1 | 0 | 0 | 0 | 0 | 1 | 1 | 0 |
| re2 | 169 | 1 | 0 | 1 | 0 | 1 | 0 | 0 | 1 |

| d3 | 86 | 0 | 1 | 0 | 1 | 0 | 1 | 1 | 0 |
|---|---|---|---|---|---|---|---|---|---|
| fsd3 | 97 | 0 | 1 | 1 | 0 | 0 | 0 | 0 | 1 |
| re3 | 55 | 0 | 0 | 1 | 1 | 0 | 1 | 1 | 1 |

FIG. 14C

NORMAL CASE

| d1 | 93 |
|---|---|

| | [7] | [6] | [5] | [4] | [3] | [2] | [1] | [0] |
|---|---|---|---|---|---|---|---|---|
| d2 | 148 | 1 | 0 | 0 | 1 | 0 | 1 | 0 | 0 |
| fsd2 | 209 | 1 | 1 | 0 | 1 | 0 | 0 | 0 | 1 |
| re2 | 69 | 0 | 1 | 0 | 0 | 0 | 1 | 0 | 1 |

| d3 | 220 | 1 | 1 | 0 | 1 | 1 | 1 | 0 | 0 |
|---|---|---|---|---|---|---|---|---|---|
| fsd3 | 43 | 0 | 0 | 1 | 0 | 1 | 0 | 1 | 1 |
| re3 | 247 | 1 | 1 | 1 | 1 | 0 | 1 | 1 | 1 |

FIG. 14D bit position [6] ERROR CASE

| d1 | 93 |
|---|---|

| | | [7] | [6] | [5] | [4] | [3] | [2] | [1] | [0] |
|---|---|---|---|---|---|---|---|---|---|
| d2 | 148 | 1 | 0 | 0 | 1 | 0 | 1 | 0 | 0 |
| fsd2 | 145 | 1 | 0 | 0 | 1 | 0 | 0 | 0 | 1 |
| re2 | 5 | 0 | 0 | 0 | 0 | 0 | 1 | 0 | 1 |

| d3 | 27 | 0 | 0 | 0 | 1 | 1 | 0 | 1 | 1 |
| fsd3 | 236 | 1 | 1 | 1 | 0 | 1 | 1 | 0 | 0 |
| re3 | 247 | 1 | 1 | 1 | 1 | 0 | 1 | 1 | 1 |

CYCLIC REDUNDANCY CHECK SYSTEM AND CYCLIC REDUNDANCY CHECK METHOD

CROSS-REFERENCE TO RELATED APPLICATION

This application is based on and claims priority under 35 U.S.C. § 119 to Korean Patent Application No. 10-2023-0032616, filed on Mar. 13, 2023, in the Korean Intellectual Property Office, the disclosure of which is incorporated by reference herein in its entirety.

BACKGROUND

The present disclosure relates to a data processing system, and more specifically, to a Cyclic Redundancy Check (CRC) system and a CRC method for detecting an error occurring in data transmission between an image sensor and an image signal processor, the inside of the image signal processor, the image signal processor, and a display device.

When data is transmitted through a network or the like, there are various error detection methods for checking whether there is an error in the transmitted data. Representative error detection methods include a parity bit, a check sum, and a CRC.

The error detecting method by CRC has higher reliability than parity bits and checksums, and not only has less overhead for error detection, but also has excellent performance in detecting various errors including random errors and burst errors.

The CRC detects errors by using a preset number as a divisor between the transmitting system and the receiving system. In current data communication systems, several standardized polynomials are used as divisors, and the remainder obtained by performing division with the standardized divisors is used as the CRC code.

The transmitting system calculates the CRC code using the transmitted data and attaches the CRC code to the end of the transmitted data before transmitting. The receiving system divides the received data by the divisor and determines whether the remainder is 0. If the remainder is 0, the received data is determined to be error-free.

CRC is a technique widely used in the data link layer, and has the advantage of being easy to implement in hardware while having strong error detection performance. In most communication systems, CRC is used as a means for error detection, and various methods for improving the speed of CRC operation in CRC, reducing the calculator and chip area required for a CRC operation, and driving a CRC operation with low power have been sought.

SUMMARY

Embodiments provide a Cyclic Redundancy Check (CRC) system and a CRC method for standardizing unstructured data and performing an optimized CRC operation to improve CRC processing speed and also being capable of avoiding complexity increase and performance degradation of an image processing system, improving use efficiency of an image signal processor in terms of area and power, safely protecting stored data, and processing the stored data quickly at the same time.

According to an aspect of an example embodiment, there is provided a cyclic redundancy check (CRC) system including a data folding processing circuit and a CRC processing circuit, wherein the data folding processing circuit includes a first bit fold circuit configured to fold first input data into first fold data, a second bit fold circuit configured to fold second input data into second fold data, and a stream fold circuit configured to generate first fold streaming data based on the first fold data and the second fold data, wherein the CRC processing circuit includes a first flip-flop configured to receive and store first dividend data of a first cycle, a second flip-flop configured to receive and store the first fold streaming data of the first cycle, and a CRC logic configured to perform a CRC operation on the first dividend data and the first fold streaming data.

Also provided herein is a cyclic redundancy check (CRC) system including a data folding processing circuit; a CRC processing circuit; and a counter, wherein the data folding processing circuit includes: a first bit fold rotation circuit configured to fold first input data into first fold data and rotate a first bit position of the first fold data, a second bit fold rotation circuit configured to fold second input data into second fold data and rotates a second bit position of the second fold data, and a stream fold circuit configured to generate first fold streaming data, based on the first fold data and the second fold data, wherein the CRC processing circuit includes: a first flip-flop configured to receive and store first dividend data of a first cycle, a second flip-flop configured to receive and store the first fold streaming data of the first cycle, and a CRC logic configured to perform a CRC operation on the first dividend data and the first fold streaming data, and wherein the counter is configured to provide a counter signal to the first bit fold rotation circuit and the second bit fold rotation circuit to rotate first bit positions of the first fold data and the second fold data.

According to an aspect of an example embodiment, there is provided a CRC method including a data folding processing method and a CRC processing method, wherein the data folding processing method includes folding first input data into first fold data, folding second input data into second fold data, and streaming the first fold data and the second fold data as fold streaming data, wherein the CRC processing method includes receiving and storing first dividend data, receiving and storing the fold streaming data, and performing a CRC operation on the first dividend data and the fold streaming data.

According to aspect of an example embodiment, there is provided a CRC method including a data folding processing method and a CRC processing method, wherein the data folding processing method includes folding first input data into first fold data and rotating a bit position of the first input data, folding second input data into second fold data and rotating a bit position of the second input data, providing a counter signal to the first bit fold data and the second bit fold rotation circuit, and streaming the first fold data and the second fold data as fold streaming data, wherein the CRC processing method includes receiving and storing the first dividend data, receiving and storing the fold streaming data, and performing a CRC operation on the first dividend data and the fold streaming data.

BRIEF DESCRIPTION OF THE DRAWINGS

The above and/or other aspects will be more clearly understood from the following detailed description of example embodiments taken in conjunction with the accompanying drawings in which:

FIGS. 10A and 10B are tables mapping fold data, according to embodiments;

FIG. 11 is a table analyzing the fold data mapping tables of FIGS. 10A and 10B;

FIG. 13 is a diagram illustrating table mapping of CRC operations, according to an embodiment;

FIGS. 14A, 14B, 14C, and 14D are diagrams illustrating the embodiment of FIG. 13, according to embodiments;

DETAILED DESCRIPTION

Hereinafter, example embodiments will be described in detail with reference to the accompanying drawings.

Figure 1:
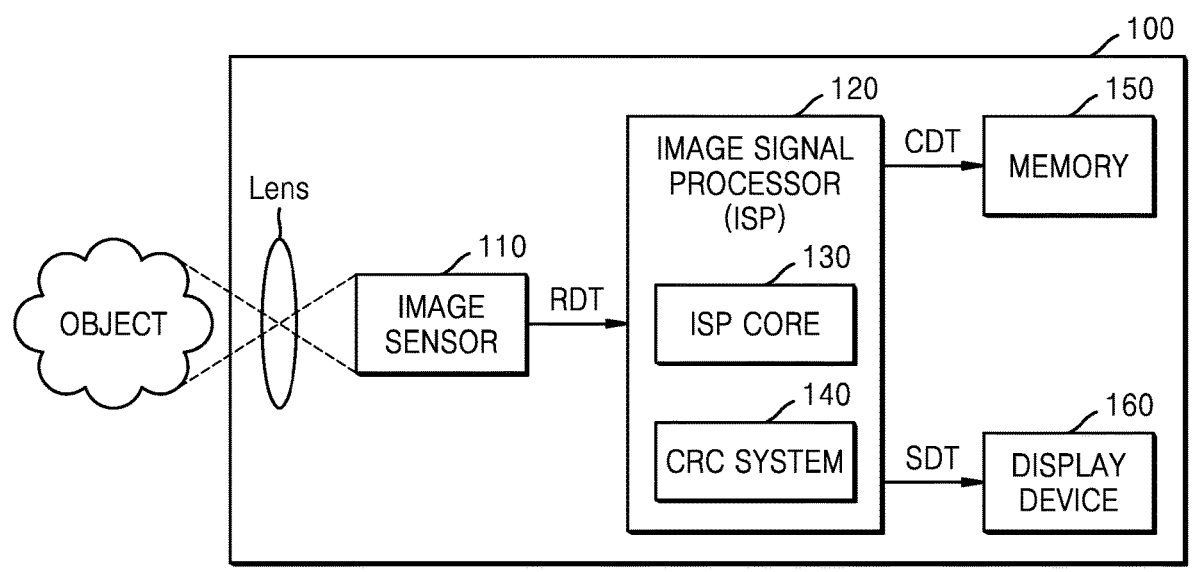
FIG. 1 is a block diagram illustrating an image processing system according to an embodiment.
Figure 2:
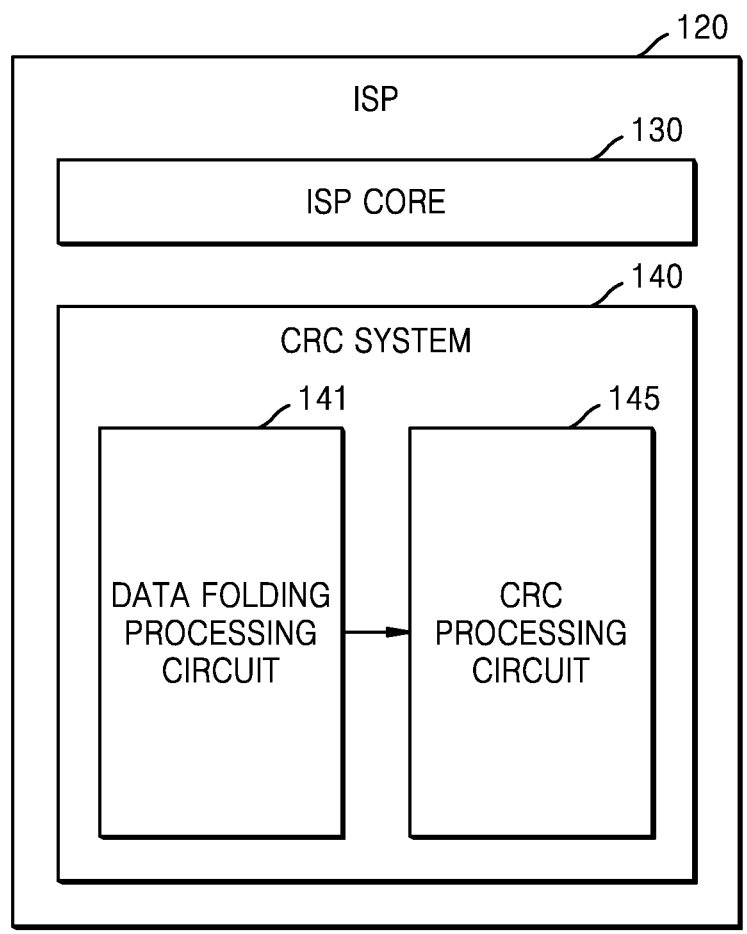
FIG. 2 is a block diagram illustrating an image signal processor of FIG. 1.

FIG. 1 is a block diagram illustrating an image processing system 100 according to an embodiment. FIG. 2 is a block diagram illustrating the image signal processor 120 of FIG. 1.

Referring to FIG. 1, the image processing system 100 may be embedded in an electronic device or implemented as an electronic device. The electronic device may be implemented as, for example, a personal computer (PC), an Internet of Things (IoT) device, or a portable electronic device. The portable electronic device may be a laptop computer, a mobile phone, a smart phone, a tablet PC, a personal digital assistant (PDA), an enterprise digital assistant (EDA), a digital still camera, a digital video camera, an audio device, a portable multimedia player (PMP), a personal navigation device (PND), an MP3 player, a handheld game console, an e-book, a wearable device, or the like.

Referring to FIG. 1, the image processing system 100 may include an image sensor 110, an image signal processor 120, a memory 150, and a display device 160.

The image sensor 110 may convert an optical signal of the subject OBJECT incident through the optical lens into an electrical signal or an image (i.e., image data). The image sensor 110 may include, for example, a pixel array including a plurality of two-dimensionally arranged pixels and a sensing circuit, and the pixel array may convert received optical signals into electrical signals. The pixel array, for example, may be implemented with a photoelectric conversion element, such as a Charge Coupled Device (CCD) or a Complementary Metal Oxide Semiconductor (CMOS), and may be implemented with various types of photoelectric conversion devices. The sensing circuit may convert an electrical signal provided from the pixel array into an image and output the converted image as a raw image RDT. The image sensor 110 may be implemented as a semiconductor chip including a pixel array and a sensing circuit.

The image signal processor 120 may process the raw image RDT provided from the image sensor 110 to generate a converted image CDT. The image signal processor 120 may process the raw image RDT provided from the image sensor 110 to generate a converted image CDT.

For example, the image signal processor 120 may image-process the raw image RDT based on the set white balance, parameters, and color space. The converted image CDT may be a color space image, such as RGB or YUV. The size of the converted image CDT, for example, resolution, may be the same as that of the raw image RDT. The converted image CDT may be stored in the memory 150. The memory 150 may be a volatile memory, such as a dynamic random access memory (DRAM) or a static RAM (SRAM), or a non-volatile memory, such as a phase change RAM (PRAM), a resistive RAM (ReRAM), or a flash memory. The converted image CDT stored in the memory 150 may be later used in the image processing system 100 or stored in a storage device.

The image signal processor 120 may include an image signal processing (ISP) core 130 and a CRC system 140. The ISP core 130 may perform image processing on a raw image (RDT) output from the image sensor 110 in units of frames. The ISP core 130 may be referred to as an image processing engine. Data generated by image processing, for example, image-processed frames (hereinafter referred to as converted image data) and/or result data (statistical data, histogram, etc.) generated by image processing may be stored in the memory 150.

Referring to FIG. 2, the CRC system 140 may include a data folding processing circuit 141 and a CRC processing circuit 145.

The data folding processing circuit 141 may receive data for a plurality of image frames. The data folding processing circuit 141 may fold data of a certain image frame to a certain bit when image processing is performed. Here, folding with a certain bit refers to converting unstructured input data into standardized data when image processing is performed on a certain image frame. For example, when the first input data id1 (see FIG. 4) is n-bit data, the data folding processing circuit 141 may fold the data into first folding data fd1 (see FIG. 4) that is m-bit data. n may be a natural number greater than m. A method of folding first input data id1 (see FIG. 4) into first fold data fd1 (see FIG. 4) will be described in detail with reference to FIGS. 4 and 5.

The CRC processing circuit 145 may perform CRC based on data received from the data folding processing circuit 141. The CRC operation method will be described in detail with reference to FIG. 7.

Figure 3:
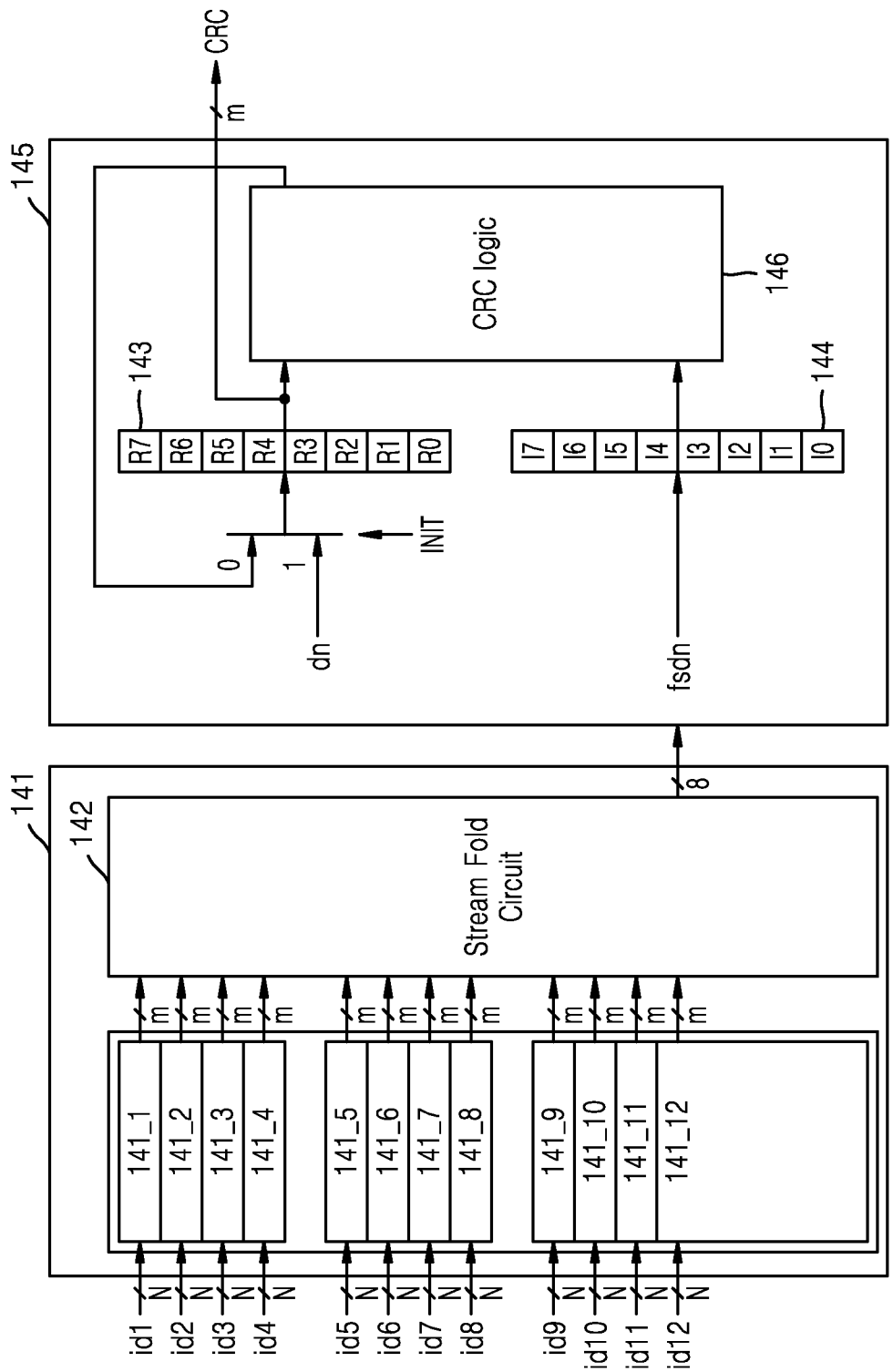
FIG. 3 is a block diagram illustrating a CRC system according to an embodiment.

Referring back to FIG. 1, the image signal processor 120 may generate the scaled image SDT by reducing or increasing the size of the converted image CDT. For example, the image signal processor 120 may generate the scaled image SDT by scaling the size, that is, the resolution, of the converted image CDT to match the resolution of the display device 160. The image signal processor 120 may provide the scaled image SDT to the display device 160. FIG. 3 is a block diagram illustrating a CRC system 140 according to an embodiment.

Referring to FIG. 3, the CRC system 140 may include a data folding processing circuit 141 and a CRC processing circuit 145.

The data folding processing circuit 141 may include first to twelfth bit fold circuits 141_1 to 141_12 and a stream fold circuit 142, and the CRC processing circuit 145 may include a first flip-flop 143, a second flip-flop 144, and a CRC logic 146.

A CRC is an error detection and/or error correction code used in digital networks and storage devices to detect accidental changes to data. Blocks of data have a short check value attached, based on the remainder of a polynomial division of their contents. On retrieval, the calculation is repeated and, in the event the check values do not match, corrective action can be taken against data corruption.

The CRC logic of embodiments may be implemented with a clock, a series of D flip-flops chained together and a number of XOR gates with inputs connected to selected outputs of the D flip-flops. The connections of the XOR gates to the D flip-flops correspond to the polynomial implemented by the CRC logic.

As background, a non-limiting example of computing a CRC can be found in the Internet Engineering Task Force (IETF) document RFC 3385.

The first to twelfth bit fold circuits 141_1 to 141_12 may fold the first to twelfth input data into first to twelfth folding data fd1 to fd12, respectively. For example, the first bit fold circuit 141_1 may fold the first input data id1 into the first fold data fd1, and the second bit fold circuit 141_2 may fold the second input data id2 into second fold data fd2.

The stream fold circuit 142 may receive the first to twelfth fold data fd1 to fd12 generated by the first to twelfth bit fold circuits 141_1 to 141_12. The stream fold circuit 142 may generate first to m-th fold streaming data based on the received first to twelfth fold data. For example, the stream fold circuit 142 may generate first fold streaming data fsd1 based on the first fold data fd1 and the second fold data fd2.

The first flip-flop 143 may receive and store the first divisor data d1. For example, in the first cycle, the first flip-flop 143 may receive and store the first divisor data d1, and in the second cycle, the first flip-flop 143 may receive and store the second divisor data d2.

The second flip-flop 144 may receive and store the first to m-th fold streaming data fsd1 to fsdm. For example, in the first cycle, the second flip-flop 144 may receive and store the first fold streaming data fsd1. In the second cycle, the second flip-flop 144 may receive and store the second fold streaming data fsd2.

The CRC logic 146 may perform a CRC operation on the first divisor data d1 received from the first flip-flop 143 and the first fold streaming data fsd1 received from the second flip-flop 144. In addition, the CRC logic 146 may perform a CRC operation on the second divisor data d2 received from the first flip-flop 143 and the second fold streaming data fsd2 received from the second flip-flop 144.

Figure 4:
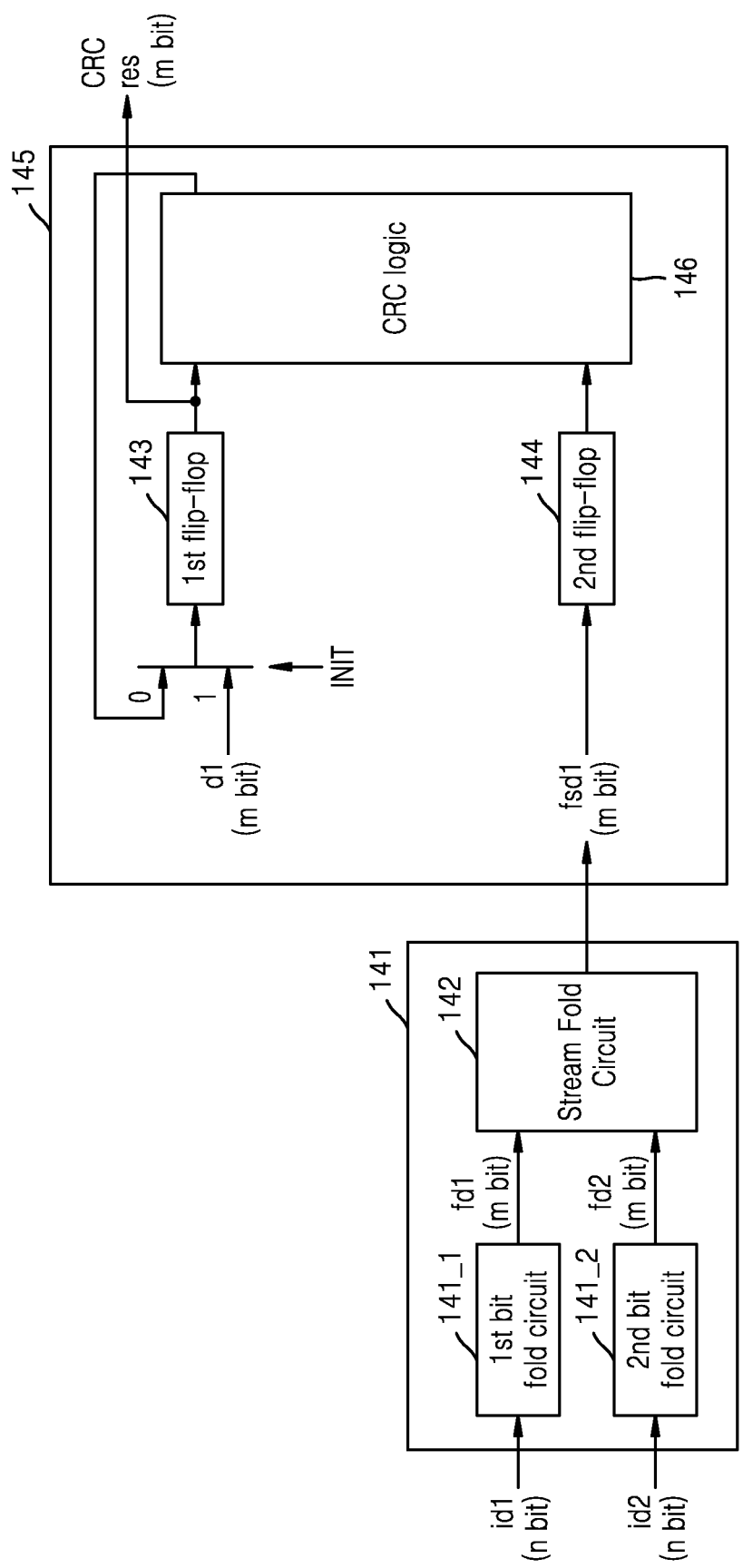
FIG. 4 is a block diagram illustrating a CRC system according to an embodiment.
Figure 5:
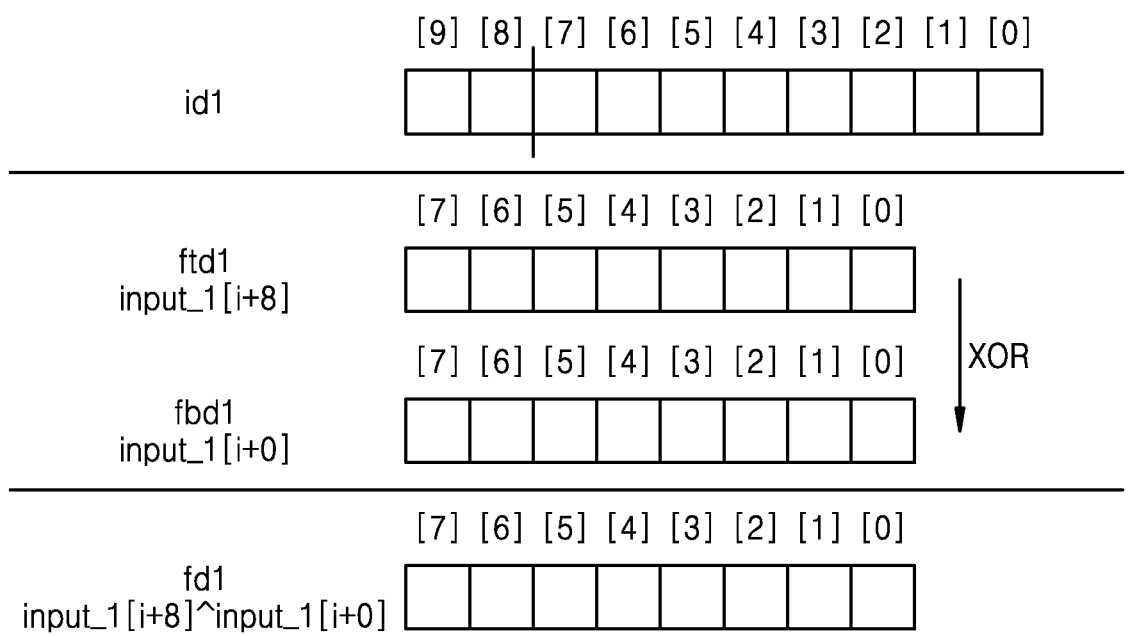
FIG. 5 is a diagram illustrating a method of generating fold data in a bit fold circuit, according to an embodiment.
Figure 6:
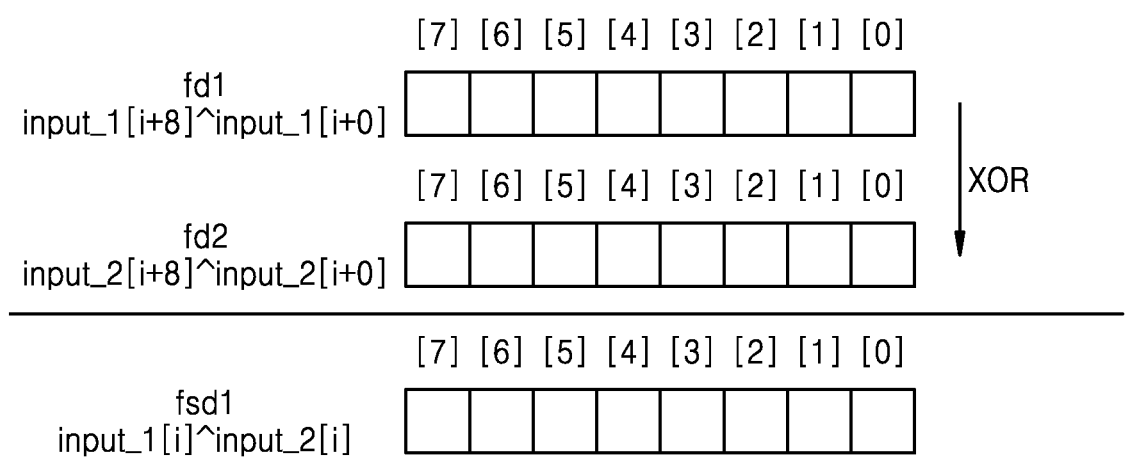
FIG. 6 is a diagram illustrating a method of generating stream fold data in a stream fold circuit, according to an embodiment.

FIG. 4 is a block diagram illustrating a CRC system 140 according to an embodiment. FIG. 5 is a diagram illustrating a method of generating fold data fd_n in the bit fold circuit 141_n according to an embodiment. FIG. 6 is a diagram illustrating a method of generating stream fold data fsd_n in the stream fold circuit 142 according to an embodiment.

Referring to FIG. 4, a case in which first input data id1 and second input data id2 are input to the data folding processing circuit 141 will be described.

The data folding processing circuit 141 may include a first bit fold circuit 141_1, a second bit fold circuit 141_2, and a stream fold circuit 142. The first bit fold circuit 141_1 may fold the first input data id1 into first folding data fd1.

Referring to FIGS. 4 and 5 together, the first bit fold circuit 141_1 is a diagram illustrating folding of the first input data id1 into first folding data fd1. The first input data id1 may be n-bit data. The first input data id1 may include first folding upper input data ftd1 and first folding lower input data fbd1. The first folding upper input data ftd1 and the first folding lower input data fbd1 may be m-bit data. Here, folding data may refer to dividing n-bit data into m-bit data. For example, as shown in FIG. 5, it is assumed that the first input data id1 is 10-bit data of [9:0] and the first folding data fd1 is 8-bit data of [7:0]. It is assumed that n-bit data is 10-bit data and m-bit data is 8-bit data.

To fold first input data id1 including 10 bits into first folding data fd1 including 8 bits, the first input data id1 may be converted into 16-bit data, which is twice as large as 8 bits, and upper 8-bit data and lower 8-bit data of the first input data id1 may be operated bit by bit. Since the first input data id1 includes 10 bits, the upper 6 bits [15:10] may be padded with 0 to convert the first input data id1 into 16-bit data. Thereafter, the 16-bit data may be split or divided into two 8-bit data, that is, the first folding upper input data ftd1 [15:8] and the first folding lower input data fbd1 [7:0]. In order to fold first input data id1 containing n bits into first folding data fd1 containing m bits (m is a natural number smaller than n), convert the first input data into 2 m bit data, the upper m bit data and the lower m bit data of the first input data id1 can be operated for each bit position.

The first bit fold circuit 141_1 may generate first fold data fd1 by performing an exclusive OR (XOR) operation between the same bit positions of the first folding upper input data ftd1 and the first folding lower input data. For example, an XOR operation may be performed between bit of the first folding upper input data ftd1 and [7] bit of the first folding lower input data fbd1, and an XOR operation may be performed between the bit of the first folding upper input data ftd1 and the [6] bit of the first folding lower input data fbd1, between the bit of the first folding upper input data ftd1 and the [5] bit of the first folding lower input data fbd1, between the bit of the first folding upper input data ftd1 and the [4] bit of the first folding lower input data fbd1, between the bit of the first folding upper input data ftd1 and the [3] bit of the first folding lower input data fbd1, between the bit of the first folding upper input data ftd1 and the [2] bit of the first folding lower input data fbd1, between the [9] bit of the first folding upper input data ftd1 and the [1] bit of the first folding lower input data fbd1, and between the [8] bit of the first folding upper input data ftd1 and the [0] bit of the first folding lower input data fbd1.

That is, it is possible to perform an XOR operation between the [i+8] bit of the first folding upper input data ftd1 and the [i+0] bit of the first folding lower input data fbd1 (i is an integer between 0 and 7). The first bit fold circuit 141_1 performs an XOR operation between the [i+8] bit of the first folding upper input data ftd1 and the [i+0] bit of the first folding lower input data fbd1 to generate the first fold data fd1.

Referring to FIG. 5, first folding upper input data ftd1 may be represented by input_1[$i$+8], and first folding lower input data fdb1 may be represented by input_1[$i$+0]. Here, i may be an integer of 0 or more and 7 or less. The first fold data fd1 is obtained by performing an XOR operation between the same bit positions of the first folding upper input data input_1 [$i$+8] and the first folding lower input data input_1 [$i$+0], and may be expressed as [$i$+8]^input_1[$i$+0].

Similarly, the second bit fold circuit 141_2 also generates second fold data by performing an XOR operation between the [i+8] bit of the second folding upper input data and the [i+0] bit of the second folding lower input data.

FIGS. 4 and 5 have been described on the assumption that the first input data id1 is 10-bit data, and the first folding upper input data ftd1 and the first folding lower input data fbd1 are 8-bit data, and in general, if the first input data id1 is n-bit data, and the first folding upper input data ftd1 and the first folding lower input data fbd1 are m-bit data, the first bit fold circuit 141_1 performs an XOR operation between the [i+m] bit of the first folding upper input data ftd1 and the [i+0] bit of the first folding lower input data fbd1 to generate the first Fold data fd1. The same applies to the second bit fold circuit 141_2 and the k-th fold processing circuit (k is a natural number).

Referring back to FIG. 4, the stream fold circuit 142 may receive first fold data fd1 and second fold data fd2 generated by the first bit fold circuit 141_1 and the second bit fold circuit 141_2. The stream fold circuit 142 may generate first fold streaming data fsd1 based on the first fold data fd1 and the second fold data fd2.

Referring to FIGS. 4 and 6, assuming that the first fold data fd1 and the second fold data fd2 are m-bit data, here 8-bit data, generating the first fold streaming data fsd1 will be described.

The first fold data fd1 may consist of 8-bit data [7:0], and the second fold data fd2 may also consist of 8-bit data [7:0].

The stream fold circuit 142 may generate the first fold streaming data fsd1 by performing an XOR operation between the same bit positions of the first fold data fd1 and the second fold data fd2.

For example, an XOR operation may be performed between the [7] bit of the first fold data fd1 and the [7] bit of the second fold data fd2, between the [6] bit of the first fold data fd1 and the [6] bit of the second fold data fd2, between the [5] bit of the first fold data fd1 and the [5] bit of the second fold data fd2, between the [4] bit of the first fold data fd1 and the [4] bit of the second fold data fd2, between the [3] bit of the first fold data fd1 and the [3] bit of the second fold data fd2, between the [2] bit of the first fold data fd1 and the [2] bit of the second fold data fd2, between the [1] bit of the first fold data fd1 and the [1] bit of the second fold data fd2, and between the [0] bit of the first fold data fd1 and the [0] bit of the second fold data fd2.

The stream fold circuit 142 may generate the first fold streaming data fsd1 by performing an XOR operation between the [i] bit of the first fold data fd1 and the [i] bit of the second fold data fd2 (i is an integer between 0 and 7).

The first fold data fd1 may be represented as input_1[i+8]^input_1[i+0], and the second fold data fd2 may be represented as input_2[i+8]^input_[i+0], and the first fold streaming data fsd1 is obtained by performing an XOR operation is performed between the same bit positions of the first fold data (input_1[i+8]^input_1[i+0]) and the second fold data (input_2[i+8]^input_2[i+0]) and may be expressed as input_1[i]^input_2[i].

FIGS. 4 and 6 have been described assuming that the first fold data fd1 and the second fold data fd2 are 8-bit data, but in general, when the first fold data fd1 and the second fold data fd2 are n-bit data, i may be an integer greater than or equal to 0 and less than or equal to n−1.

Referring to FIGS. 4 to 6, the data folding processing circuit 141 folds or divides unspecified n-bit data to generate certain m-bit data, thereby improving image processing efficiency of the image signal processor. Since the folding process is composed of an XOR operation, the processing method after the CRC logic 146 and the processing method before the CRC logic 146 may obtain the same error detection rate according to the XOR commutation rule. In contrast to the method of folding a plurality of stream data after processing the CRC logic 146, respectively, it is possible to maintain the same error detection rate with a small area and power consumption by using a single CRC logic 146 device that occupies a high ratio in the number of operators, area, and power consumption in the device.

Figure 7:
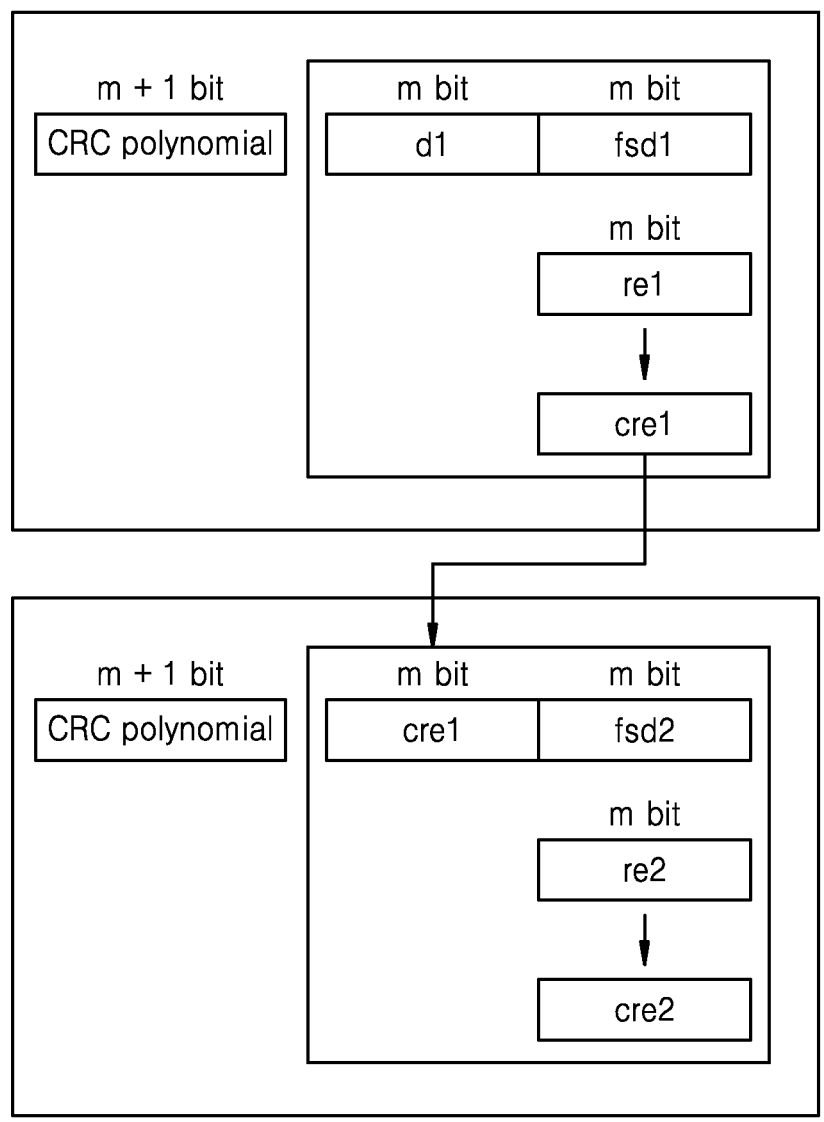
FIG. 7 is a diagram illustrating a method of performing a CRC operation in CRC logic, according to an embodiment.

FIG. 7 is a diagram illustrating a method of performing a CRC operation in a CRC logic 146 according to an embodiment.

Referring to FIG. 7, the divisor data may be m+1 bit data, and first divisor data d1, first fold streaming data fsd1, first remainder data re1, first CRC result data cre1, second divisor data d2, second fold streaming data fsd2, second remainder data re2, and second CRC result data cre2 may be m-bit data.

In the first cycle, an XOR operation is performed on the divisor data with the first divisor data d1 and the first fold streaming data fsd1 to obtain the first remainder data re1. The first remainder data re1 may be first CRC result data.

In the second cycle, the first CRC result data cre1 of the first cycle may constitute second divisor data. The second remainder data re2 may be obtained by performing an XOR operation on the divisor data with the second divisor data d2 and the second fold streaming data fsd2. The second remainder data re2 may be second CRC result data cre2.

In the CRC logic 146, in the n-th cycle, a CRC operation may input the remainder data of the (n−1)-th cycle as divisor data.

Figure 8:
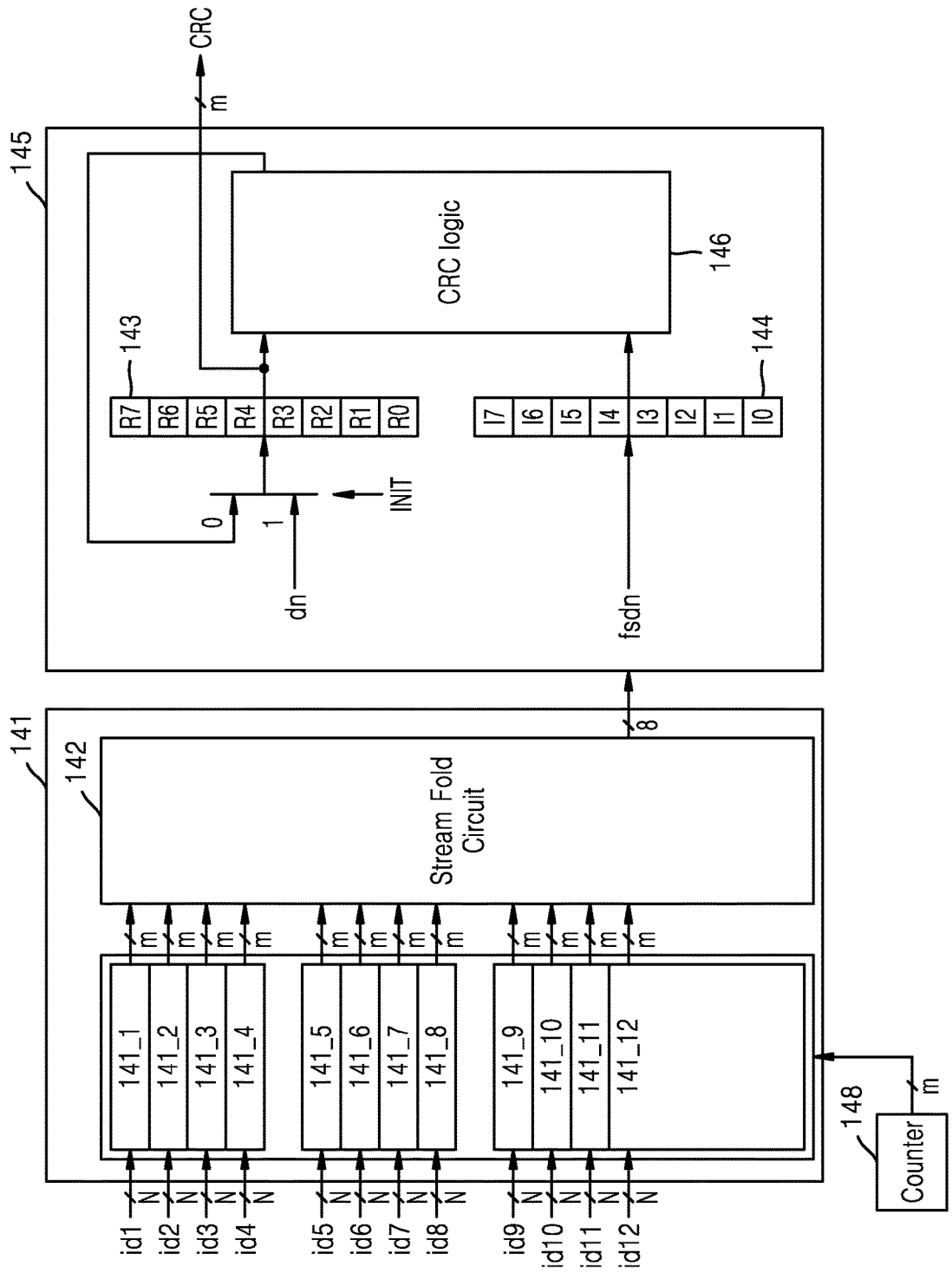
FIG. 8 is a block diagram illustrating a CRC system according to an embodiment.

FIG. 8 is a block diagram illustrating a CRC system 140 according to an embodiment. Content overlapping with FIG. 3 will be omitted and described.

Referring to FIG. 8, the CRC system 140 may include a data folding processing circuit 141, a CRC processing circuit 145, and a counter 148.

The data folding processing circuit 141 may include first to twelfth bit fold rotation circuits 141_r1 to 141_r12 and a stream fold circuit 142, and the CRC processing circuit 145 may include a first flip-flop 143, a second flip-flop 144, and a CRC logic 146.

The first to twelfth bit fold rotation circuits 141_r1 to 141_r12 may fold the first to twelfth input data into first to twelfth fold data fd1 to fd12, respectively, and may rotate bit positions of the first to twelfth fold data fd1 to fd12, respectively. For example, the first bit fold rotation circuit 141_r1 may fold the first input data id1 into the first fold data fd1 and rotate the bit position of the first fold data fd1. The second bit fold rotation circuit 141_r2 may fold the second input data id2 into the second fold data and rotate the bit position of the second fold data fd2. Here, rotating may refer to changing bit positions between fold data.

The stream fold circuit 142 may receive the first to twelfth fold data fd1 to fd12 generated by the first to twelfth bit fold rotation circuits 141_r1 to 141_r12. The stream fold circuit 142 may generate first to m-th fold streaming data based on the received first to twelfth fold data. For example, the stream fold circuit 142 may generate first fold streaming data based on the first fold data fd1 and the second fold data fd2.

The counter 148 may rotate the bit positions of the first to twelfth fold data fd1 to fd12 by providing a counter signal to the first to twelfth bit fold rotation circuits 141_r1 to 141_r12. The first to twelfth bit fold rotation circuits 141_r1 to 141_r12 may rotate bit positions of the first to twelfth fold data fd1 to fd12 only when a counter signal is provided.

Figure 9:
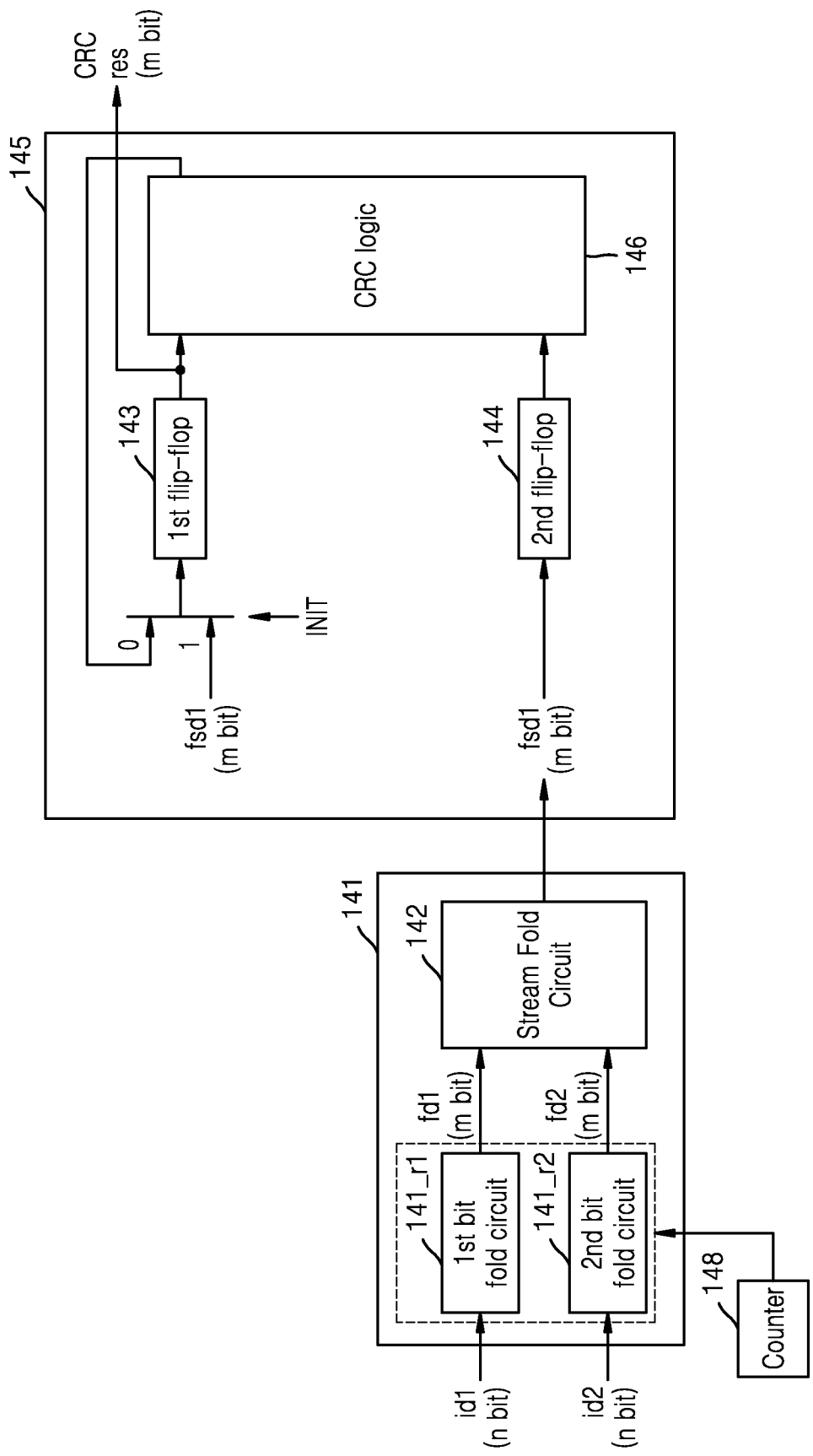
FIG. 9 is a block diagram illustrating a CRC system according to an embodiment.

FIG. 9 is a block diagram illustrating a CRC system 140 according to an embodiment. Hereinafter, descriptions overlapping with those of FIG. 4 will be omitted.

Referring to FIG. 9, a case in which first input data id1 and second input data id2 are input to the data folding processing circuit 141 will be described.

The data folding processing circuit 141 may include a first bit fold rotation circuit 141_r1, a second bit fold rotation circuit 141_r2, and a stream fold circuit 142. The first bit fold rotation circuit 141_r1 may fold the first input data id1 into the first folded data fd1 and rotate the bit position of the first fold data fd1.

FIGS. 10A and 10B are tables mapping fold data according to embodiments. FIG. 11 is a table analyzing the fold data mapping tables of FIGS. 10A and 10B.

FIG. 10A is a mapping table showing that the n-th bit fold rotation circuit 141_rn folds the n-th input data idn into the n-th folding data fdn, and FIG. 10B is a mapping table showing that the n-th bit fold rotation circuit 141_rn folds the n-th input data idn into the n-th folding data fdn and rotates the bit position of the n-th folding data fdn.

FIG. 11A is a mapping table obtained by analyzing the mapping tables shown in FIGS. 10A and 10B.

Detailed examples of the mapping tables of FIGS. 10A and 10B will be described in detail with reference to FIGS. 12A, 12B, 12C, and 12D to be described later. In addition, a detailed example of the mapping table analysis of FIG. 11 will be described with reference to FIGS. 12A to 12D to be described later.

FIGS. 12A, 12B, 12C, and 12D are diagrams illustrating the embodiment of FIGS. 10 and 11.

Figure 12A:
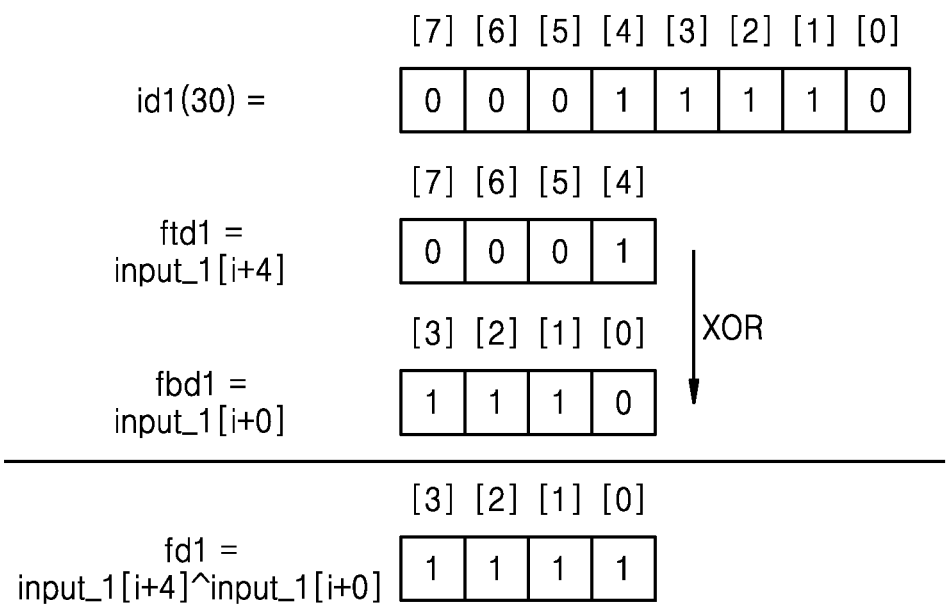
FIGS. 12A, 12B, 12C, and 12D are diagrams illustrating the embodiments of FIGS. 10A, 10B, and 11.

Referring to FIGS. 12A and 9 together, it is a diagram illustrating that the first bit fold rotation circuit 141_r1 folds the first input data id1 into first folding data fd1. The first input data id1 may be n-bit data. The first input data id1 may include first folding upper input data ftd1 and first folding lower input data fbd1. The first folding upper input data ftd1 and the first folding lower input data fbd1 may be m-bit data. Here, folding data may refer to dividing n-bit data into m-bit data. For example, suppose that the first input data id1 is 8-bit data of [7:0] and the first folding data fd1 is 4-bit data of [3:0]. That is, it is assumed that n-bit data is 8-bit data and m-bit data is 4-bit data.

When the first input data id1 is 30, to fold the 8-bit first input data id1 into the 4-bit first folding data fd1, the first input data id1 may be split or divided into 4 bits. In this case, the first input data id1 may be divided into first folding upper input data ftd1 [7:4] and first folding lower input data fbd1 [3:0].

The first bit fold rotation circuit 141_r1 may generate first fold data fd1 by performing an XOR operation between the same bit positions of the first folding upper input data ftd1 and the first folding lower input data.

The first bit fold rotation circuit 141_r1 performs an XOR operation between the [i+4] bit of the first folding upper input data ftd1 and the [i+0] bit of the first folding lower input data fbd1 to generate the first fold data fd1 (i is an integer greater than or equal to 0 and less than or equal to 3).

In FIG. 12A, it is assumed that the first input data id1 is 8-bit data, and the first folding upper input data ftd1 and the first folding lower input data fbd1 are 4-bit data, but embodiments are not limited thereto.

That is, if the first input data id1 is n-bit data, and the first folding upper input data ftd1 and the first folding lower input data fbd1 are m-bit data, the first bit fold circuit 141_1 may perform an XOR operation between the [i+m] bit of the first folding upper input data ftd1 and the [i+0] bit of the first folding lower input data fbd1 to generate the first fold data fd1.

Referring to FIG. 12A, first folding upper input data ftd1 may be represented by input_1[$i+4$], and first folding lower input data fdb1 may be represented by input_1[$i+0$]. Here, i may be an integer of 0 or more and 3 or less. The first fold data fd1 is obtained by performing an XOR operation between the same bit positions of the first folding upper input data input_1 [$i+4$] and the first folding lower input data input_1[$i+0$], and may be expressed as [$i+4$]^input_1[$i+0$].

Figure 12B:
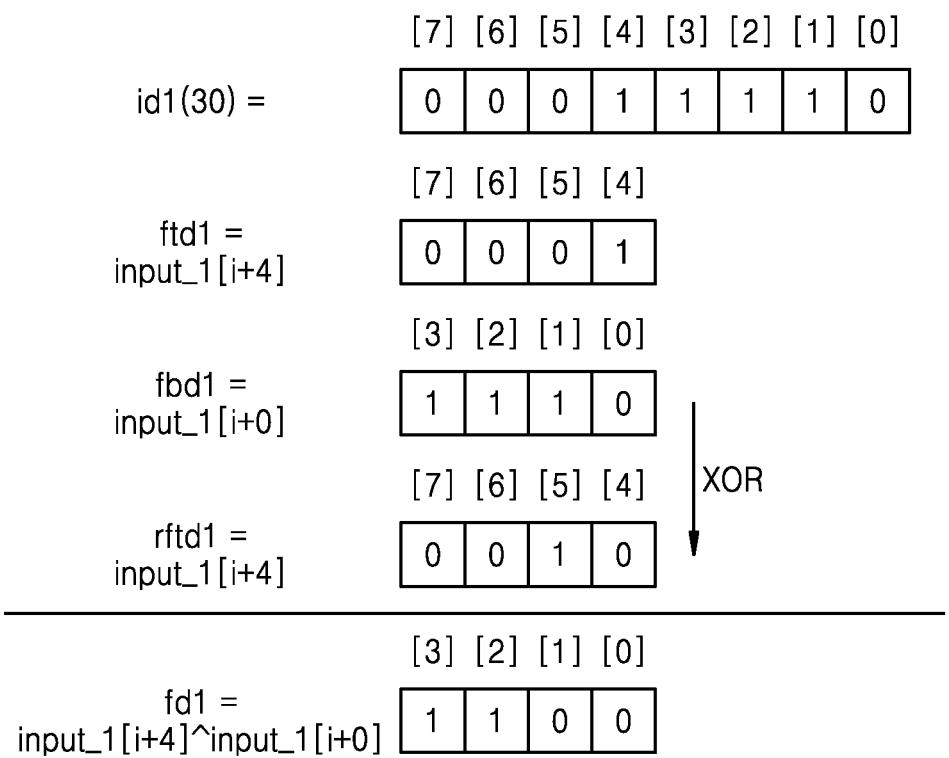

Referring to FIGS. 9 and 12B together, it is shown that the first bit fold rotation circuit 141_r1 folds the first input data id1 and rotates the bit position to generate the first fold data fd1.

Referring to FIG. 12B, the rotated first folding upper input data rftd1 may refer to data obtained by rotating or shifting the first folding upper input data ftd1 by 1 bit to the left.

The difference between FIGS. 12B and 12A is that the first bit fold rotation circuit 141_r1 rotates the bit position of the first folding upper input data ftd1 to generate the rotated first folding upper input data ftd1. If the bit position of the first folding upper input data ftd1 is rotated by 1 to the left, the rotated first folding upper input data ftd1 may be generated.

The first bit fold rotation circuit 141_r1 may generate first fold data fd1 by performing an XOR operation between the same bit positions of the rotated first folding upper input data ftd1 and the first folding lower input data.

The first bit fold rotation circuit 141_r1 performs an XOR operation between the [i+4] bit of the rotated first folding upper input data ftd1 and the [i+0] bit of the first folding lower input data fbd1 to generate the first fold data fd1 (i is an integer greater than or equal to 0 and less than or equal to 3).

The first fold data fd1 generated in FIG. 12A may be located in group 15, row 16, column 2 in FIG. 10A, and the first fold data fd1 generated in FIG. 12B may be located in group 12, row 13, column 2 in FIG. 10B.

Referring to FIG. 11, when group mapping is performed on the first fold data fd1 generated in FIG. 12B, the result may be located in row 16 and column 2 in FIG. 10A. In addition, the first fold data fd1 generated in FIG. 12A may be located in row 13 and column 2 when group mapping is performed in FIG. 10B.

Figure 12C:
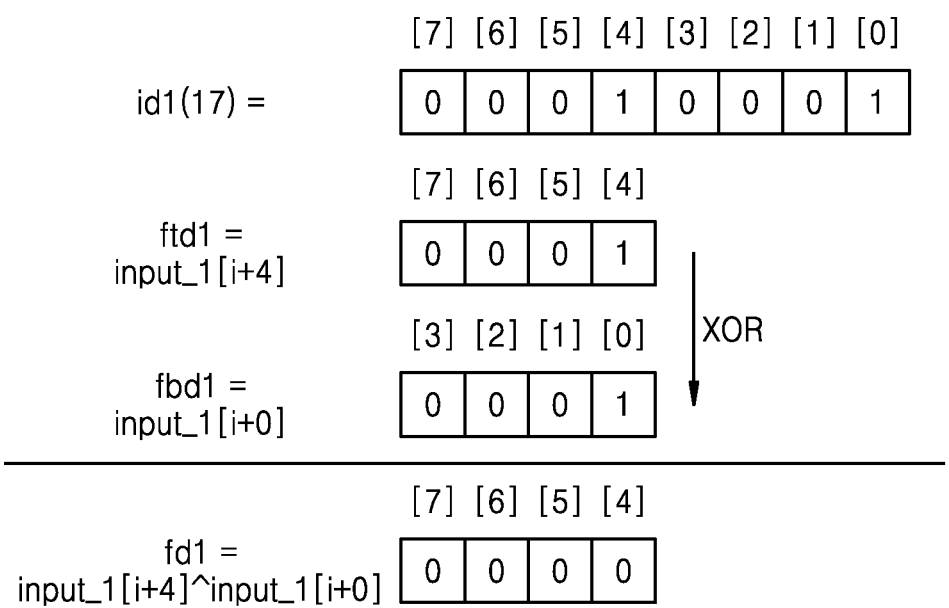

Referring to FIGS. 12C and 9 together, it is a diagram illustrating that the first bit fold rotation circuit 141_r1 folds the first input data id1 into first folding data fd1.

When the first input data id1 is 17, to fold the 8-bit first input data id1 into the 4-bit first folding data fd1, the first input data id1 may be split or divided into 4 bits. In this case, the first input data id1 may be composed of the first folding upper input data ftd1 [7:4] and the first folding lower input data fbd1 [3:0].

The first bit fold rotation circuit 141_r1 may generate first fold data fd1 by performing an XOR operation between the same bit positions of the first folding upper input data ftd1 and the first folding lower input data.

The first bit fold rotation circuit 141_r1 performs an XOR operation between the [i+4] bit of the first folding upper input data ftd1 and the [i+0] bit of the first folding lower input data fbd1 to generate the first fold data fd1 (i is an integer greater than or equal to 0 and less than or equal to 3).

In FIG. 12C, it is assumed that the first input data id1 is 8-bit data, and the first folding upper input data ftd1 and the first folding lower input data fbd1 are 4-bit data, but embodiments are not limited thereto.

That is, if the first input data id1 is n-bit data, and the first folding upper input data ftd1 and the first folding lower input data fbd1 are m-bit data, the first bit fold circuit 141_1 may perform an XOR operation between the [i+m] bit of the first folding upper input data ftd1 and the [i+0] bit of the first folding lower input data fbd1 to generate the first fold data fd1.

Referring to FIG. 12C, first folding upper input data ftd1 may be represented by input_1[i+4], and first folding lower input data fdb1 may be represented by input_1[i+0]. Here, i may be an integer of 0 or more and 3 or less. The first fold data fd1 is obtained by performing an XOR operation between the same bit positions of the first folding upper input data input_1 [i+4] and the first folding lower input data input_1[i+0], and may be expressed as [i+4]^input_1[i+0].

Figure 12D:
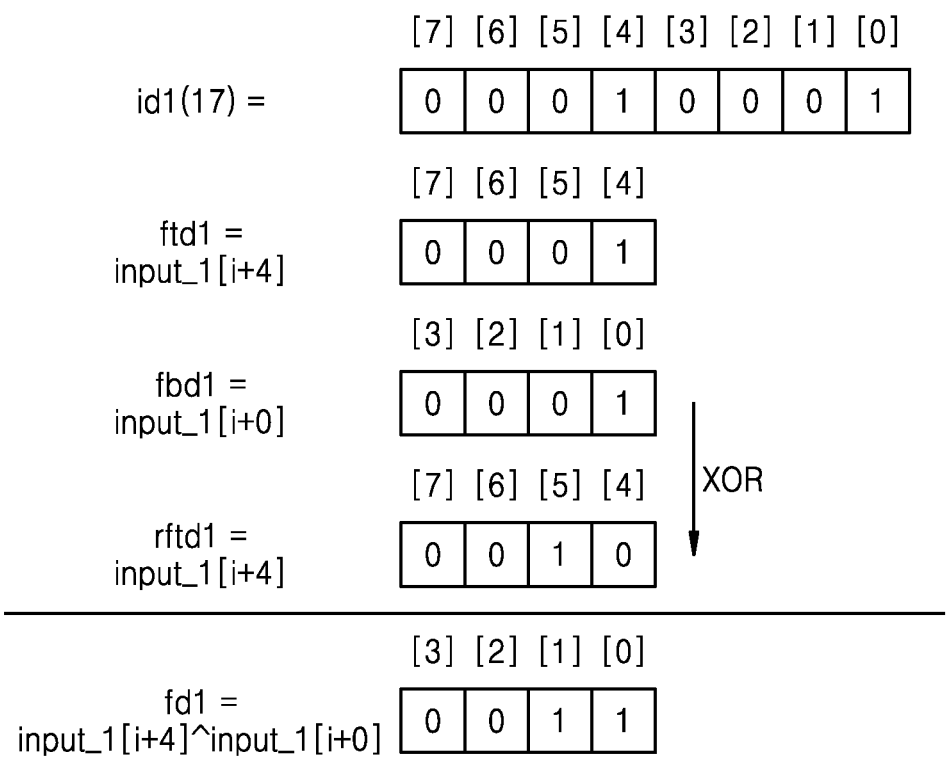

Referring to FIGS. 9 and 12D together, it is shown that the first bit fold rotation circuit 141_r1 folds the first input data id1 and rotates the bit position to generate the first fold data fd1.

Referring to FIG. 12D, the rotated first folding upper input data rftd1 may refer to data obtained by rotating or shifting the first folding upper input data ftd1 by 1 bit to the left.

The difference between FIGS. 12C and 12D is that the first bit fold rotation circuit 141_r1 rotates the bit position of the first folding upper input data ftd1 to generate the rotated first folding upper input data ftd1. If the bit position of the first folding upper input data ftd1 is rotated by 1 to the left, the rotated first folding upper input data ftd1 may be generated.

The first bit fold rotation circuit 141_r1 may generate first fold data fd1 by performing an XOR operation between the same bit positions of the rotated first folding upper input data ftd1 and the first folding lower input data.

The first bit fold rotation circuit 141_r1 performs an XOR operation between the [i+4] bit of the rotated first folding upper input data ftd1 and the [i+0] bit of the first folding lower input data fbd1 to generate the first fold data fd1 (i is an integer greater than or equal to 0 and less than or equal to 3).

The first fold data fd1 generated in FIG. 12C may be located in group 0, row 1, column 2 in FIG. 10A, and the first fold data fd1 generated in FIG. 12D may be located in group 3, row 4, column 2 in FIG. 10B.

Referring to FIG. 11A, when group mapping is performed on the first fold data fd1 generated in FIG. 12B, the result may be located in row 4 and column 2 in FIG. 10A. Referring to FIG. 11B, when group mapping is performed on the first fold data fd1 generated in FIG. 12C, the result may be located in row 1 and column 2 in FIG. 10A.

Figure 13:
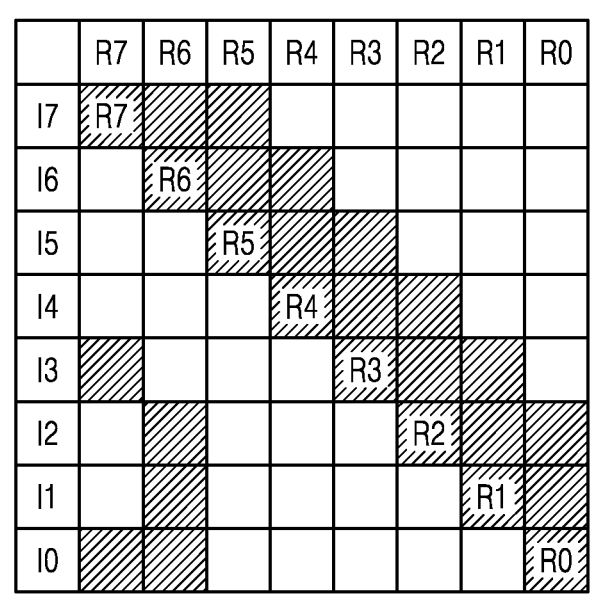

FIG. 13 is a diagram illustrating table mapping of CRC operations according to an embodiment.

Referring to FIGS. 13, 10 to 17 displayed in rows may refer to divisor data, and R0 to R7 displayed in columns may refer to dividend data. The shaded portion may refer to a case where the bit position is rotated due to the influence of 10 to 17 or R0 to R7. For example, if a bit inversion occurs in 15, the bit positions of R5, R4, and R3 may be rotated.

FIGS. 14A, 14B, 14C and 14D are diagrams illustrating the embodiment of FIG. 13 according to embodiments.

Referring to FIGS. 14A and 14B, the first dividend data d1 may be equal to 186 and the second dividend data d2 may be equal to 47. First dividend data d1, second dividend data d2, second CRC result data cre2, third dividend data d3, third fold stream data fsd3, and third CRC result data re3 may all be 8-bit data.

Referring to FIG. 14A, when no error occurs in bits of the second fold stream data fsd2 and the third fold stream data fsd3, the third CRC result data re3 may be 55.

However, referring to FIG. 14B, when an error occurs at bit position [3] of the second fold stream data fsd2, bit positions [5], [4], and [3] of the third fold stream data fsd3 error may occur. In this case, since the third CRC result data re3 is 55, which is the same as the third CRC result data re3 of FIG. 14A, the error detection rate may decrease.

Referring to FIGS. 14C and 14D, the first dividend data d1 may be equal to 93 and the second dividend data d2 may be equal to 148. First dividend data d1, second dividend data d2, second CRC result data cre2, third dividend data d3, third fold stream data fsd3, and third CRC result data re3 may all be 8-bit data.

Referring to FIG. 14C, when no error occurs in bits of the second fold stream data fsd2 and the third fold stream data fsd3, the third CRC result data re3 may be 247.

However, referring to FIG. 14B, when an error occurs at bit position [6] of the second fold stream data fsd2, bit positions [7], [6], [2], [1], and [0] of the third fold stream data fsd3 error may occur. Error detection may be avoided only when an error occurs at the bit positions [7], [6], [2], [1], and [0] of the third fold stream data fsd3. Conversely, if an error does not occur in at least one of bit positions [7], [6], [2], [1], and [0] of the third fold stream data fsd3, the error detection rate may be improved.

Since the k-th bit fold rotation circuit 141_rk according to an embodiment may rotate the bit position, if data contains errors, the error detection rate may be improved.

Figure 15:
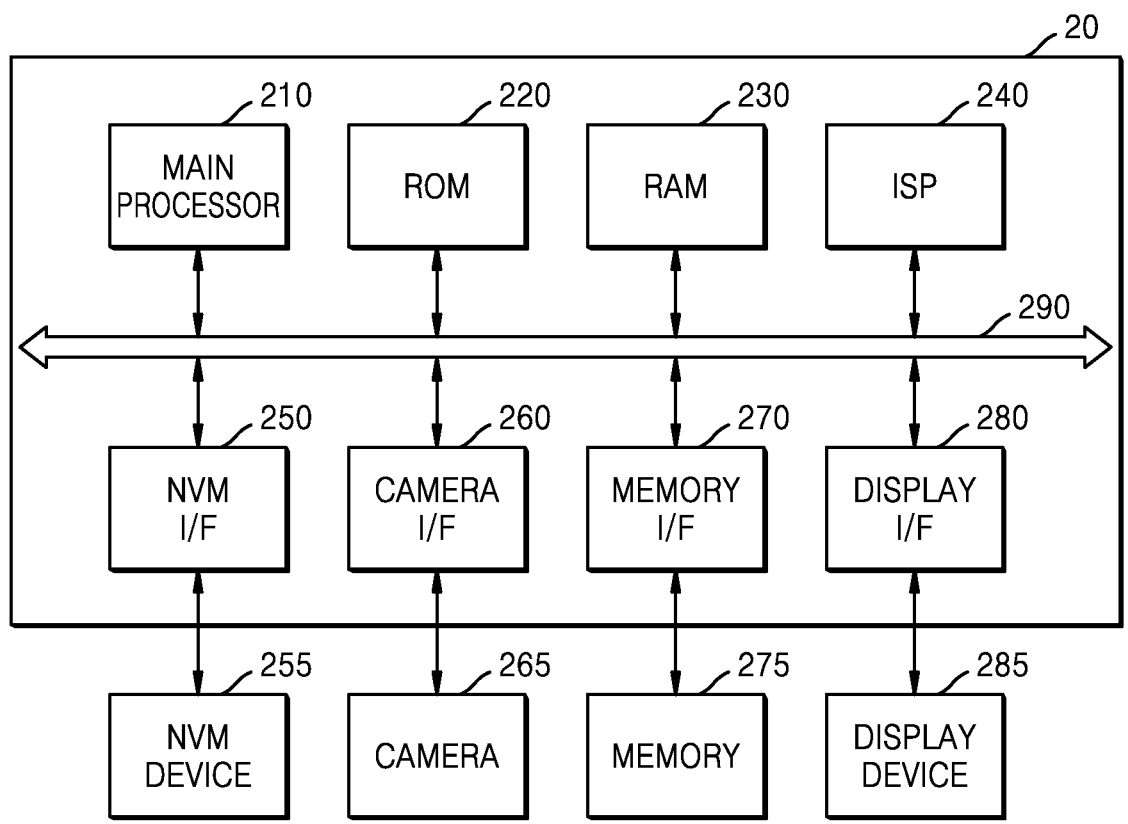
FIG. 15 is a block diagram illustrating an image processing system according to an embodiment.

FIG. 15 is a block diagram illustrating an image processing system 20 according to an embodiment.

Referring to FIG. 15, the image processing system 20 may include a main processor 210, a read only memory (ROM) 220, a random access memory (RAM) 230, an image signal processor 240, a non-volatile memory interface 250, a camera interface. 260, a memory interface 270, and a display interface 280. The components of the image processing system 20, that is, the main processor 210, the ROM 220, the RAM 230, the image signal processor 240, the non-volatile memory interface 250, the camera interface 260, the memory interface 270, and the display interface 280, may transmit and receive data through the system bus 290. In an embodiment, the image processing system 20 may be implemented as a system on chip (SoC). In an embodiment, the image processing system 20 may be an application processor.

The main processor 210 may control overall operations of the image processing system 20. The main processor 210 may be implemented as, for example, a central processing unit (CPU), a microprocessor, an Advanced RISC Machine (ARM) processor, an X86 processor, a million instructions per second (MIPS) processor, and the like, and according to the embodiment, may be implemented as one computing component having two or more independent processors (or cores), that is, a multi-core processor. The main processor 210 may process or execute instruction codes and/or data stored in the ROM 220 or the RAM 230.

The ROM 220 may store continuously used programs and/or data. The ROM may be implemented as an erasable programmable ROM (EPROM) or an electrically erasable programmable ROM (EEPROM).

The RAM 230 may temporarily store programs, data, and/or instructions. According to the embodiment, the RAM 230 may be implemented as DRAM or SRAM. The RAM 230 may temporarily store image data input/output through the interfaces 250, 260, 270, and 280, or image data processed by the image signal processor 240.

The non-volatile memory interface 250 may interface data input from the non-volatile memory device 255 or data output to the non-volatile memory. The non-volatile memory device 255 may be implemented as, for example, a memory card (e.g., MMC, eMMC, SD, and micro SD).

The camera interface 260 may interface image data (e.g., raw image data) input from a camera 265 located outside the image processing system 20. The camera 265 may generate data for an image captured by using a plurality of light sensing elements. Image data received through the camera interface 260 may be provided to the image signal processor 240 or may be stored in the memory 275 through the memory interface 270.

The memory interface 270 may interface data input from the memory 275 or data output to the memory 275. According to embodiments, the memory 275 may be implemented as volatile memory, such as DRAM or SRAM or non-volatile memory, such as ReRAM, PRAM, or NAND flash.

The display interface 280 may interface data (e.g., image data) output to the display device 285. The display device 285 may output an image signal according to image data through a display, such as a liquid-crystal display (LCD) or active matrix organic light emitting diode (AMOLED).

The image signal processor 240 may generate converted image data by performing image processing on image data provided from the camera 265, and may store the converted image data in the memory 275 or may scale the converted image data to provide the scaled image to the display device 285.

The control processor and the image signal processor described above with reference to FIGS. 1 to 14 may be applied as the main processor 210 and the image signal processor 240, respectively. By performing image data processing, an error detection rate of the image signal processor may be improved. Also, the area of the image system may be reduced, and power consumption may be reduced. In the image signal processor 240, since the degree of human perception of an error that has occurred has different characteristics for each bit, even if the same value changes in brightness, it may be insensitive in situations where the threshold for recognizing gradations by brightness is higher, so that it will be possible to improve the error detection rate for each bit.

Figure 16:
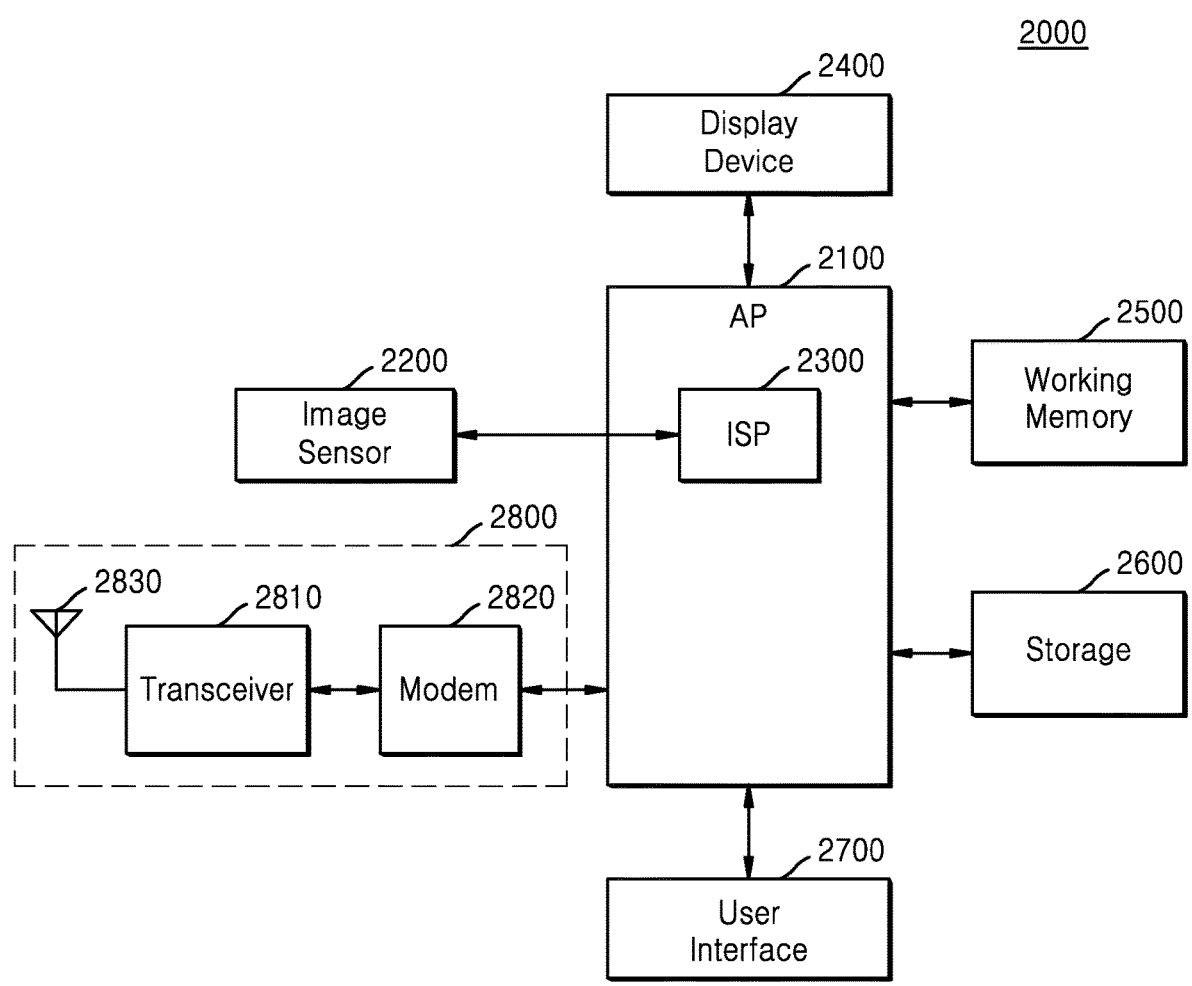
FIG. 16 is a block diagram illustrating an image processing device according to an embodiment.

FIG. 16 is a block diagram illustrating an image processing device 2000 according to an embodiment. The image processing device 2000 of FIG. 16 may be a portable terminal.

Referring to FIG. 16, an image processing device 2000 according to an embodiment may include an application processor 2100, an image sensor 2200, a display device 2400, a working memory 2500, a storage 2600, a user interface 2700, and a wireless transceiver 2800, and the application processor 2100 may include an image signal processor 2300. The image signal processor 100 of FIG. 1 may be applied as the image signal processor 2300. In an embodiment, the image signal processor 100 may be implemented as a separate integrated circuit from the application processor 2100.

The application processor 2100 may control the overall operation of the image processing device 2000 and may be provided as a system-on-chip (SoC) that drives an application program, an operating system, and the like.

The application processor 2100 may control the operation of the image signal processor 2300, and may provide the converted image data generated by the image signal processor 2300 to the display device 2400 or store the converted image data in the storage 2600.

The image sensor may generate image data, for example, raw image data, based on the received light signal, and provide the generated image data to the image signal processor 2300.

The image signal processor described with reference to FIGS. 1 to 15 may be applied as the image signal processor 2300. The image signal processor 2300 may improve an error detection rate of the image signal processor by processing image data. Also, the area of the image system may be reduced, and power consumption may be reduced.

The working memory 2500 may be implemented with a volatile memory, such as DRAM, SRMA, and the like, or a non-volatile resistive memory, such as FeRAM, RRAM, PRAM, and the like. The working memory 2500 may store programs and/or data processed or executed by the application processor 2100.

The storage 2600 may be implemented as a nonvolatile memory device, such as NAND flash, resistive memory, and the like, and for example, the storage 2600 may be provided as a memory card (e.g., MMC, eMMC, SD, and micro SD), and the like. The storage 2600 may store data and/or programs for execution algorithms that control the image processing operation of the image signal processor 2300, and data and/or programs may be loaded into the working memory 2500 when the image processing operation is performed. In an embodiment, the storage 2600 may store image data generated by the image signal processor 2300, for example, converted image data or post-processed image data.

The user interface 2700 may be implemented with various devices capable of receiving user input, such as a keyboard, a curtain key panel, a touch panel, a fingerprint sensor, and a microphone. The user interface 2700 may receive a user input and provide a signal corresponding to the received user input to the application processor 2100.

The wireless transceiver 2800 may include a transceiver 2810, a modem 2820, and an antenna 2830.

Figure 17:
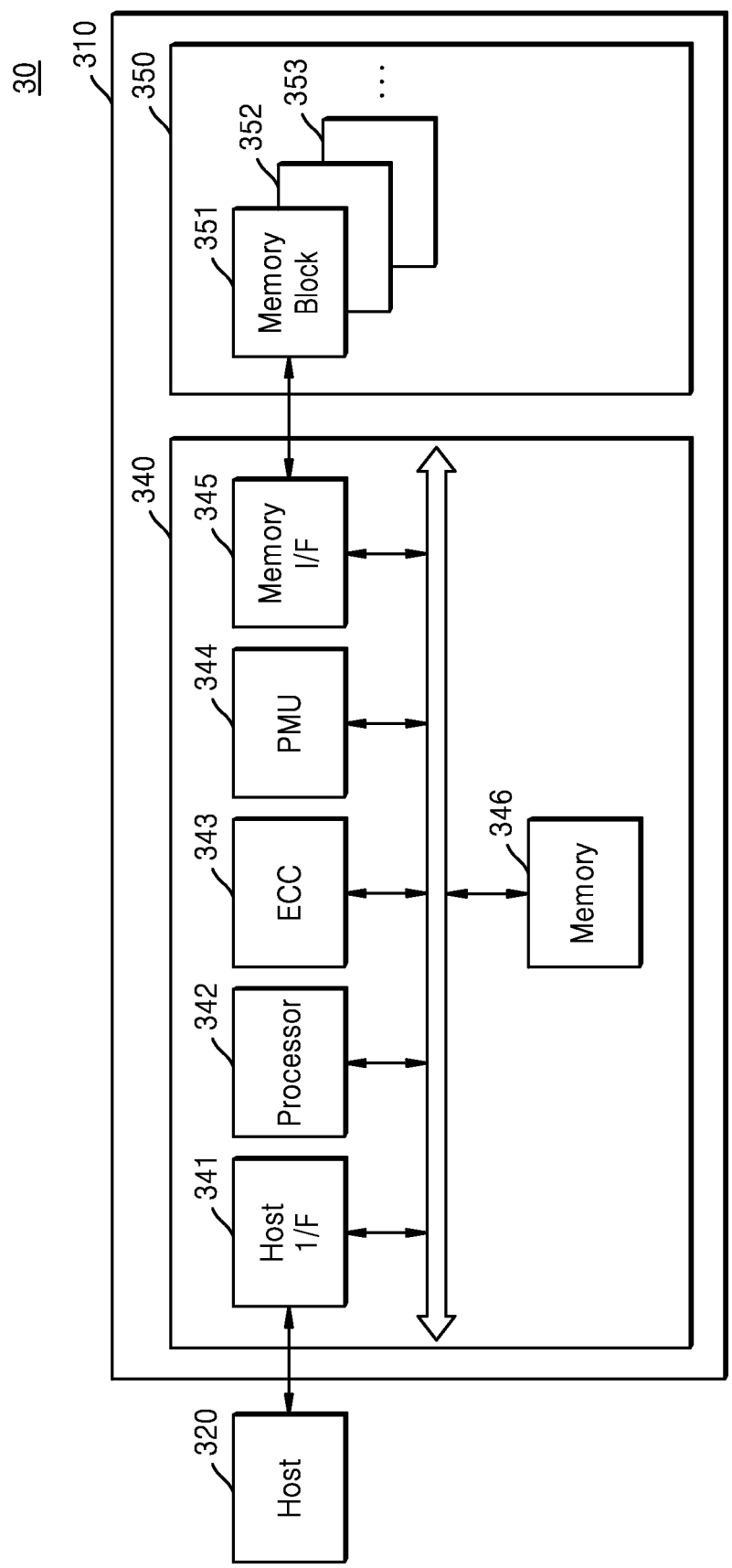
FIG. 17 is a block diagram illustrating a data processing system according to an embodiment.

FIG. 17 is a block diagram illustrating a data processing system 30 according to an embodiment.

Referring to FIG. 17, the data processing system 30 includes a host 320 and a memory system 310. For example, the host 320 and the memory system 310 may be connected through a data transmission means such as a data bus or a host cable to transmit and receive data.

The host 320 may include electronic devices, for example, portable electronic devices, such as mobile phones, MP3 players, and laptop computers, or non-portable electronic devices, such as desktop computers, game consoles, TVs, and projectors. For example, the host 320 may include a computing device or wired/wireless electronic devices.

In addition, the host 320 includes at least one operating system (OS), and the OS manages and controls overall functions and operations of the host 320 and provides mutual operations between a user using the data processing system 30 or the memory system 310 and the host 320.

The controller 340 in the memory system 310 may control the memory device 350 in response to a request from the host 320. For example, the controller 340 may perform a read operation to provide data read from the memory device 350 to the host 320, and perform a write operation (program operation) to store data provided from the host 320 in the memory device 350. To perform these data input/output operations, the controller 340 may control operations, such as read, program, and erase.

According to an embodiment, the controller 340 includes a host interface 341, a processor 342, an error correction code (ECC) 343, a power management unit (PMU) 344, a memory interface 345, and a memory 346.

Components included in the controller 340 described with reference to FIG. 17 may vary depending on the implementation type and operating performance of the memory system 310. For example, the memory system 310 may be implemented as one of various types of storage devices, such as Solid State Drive (SSD), MMC, embedded MMC (eMMC), Reduced Size MMC (RS-MMC), micro-MMC type Multi Media Card (MMC), Secure Digital (SD) cards in the form of SD, mini-SD, and micro-SD, Universal Storage Bus (USB) storage devices, Universal Flash Storage (UFS) devices, Compact Flash (CF) cards, Smart Media cards, Memory Sticks, and the like. Components included in the controller 340 may be added or removed according to the implementation form of the memory system 310.

The host 320 and the memory system 310 may include a controller or an interface for transmitting and receiving signals, data, and the like in accordance with agreed standards. For example, the host interface 341 in the memory system 310 may include a device capable of transmitting signals, data, etc. to the host 320 or receiving signals, data, etc. transmitted from the host 320.

The host interface 341 included in the controller 340 may receive signals, commands, or data transmitted from the host 320. That is, the host 320 and the memory system 310 may transmit and receive data through mutually agreed standards. As an example of an agreed standard for sending and receiving data, there are various interface protocols, such as Universal Serial Bus (USB), Multi-Media Card (MMC), Parallel Advanced Technology Attachment (PATA), Small Computer System Interface (SCSI), Enhanced Small Disk Interface (ESDI), Integrated Drive Electronics (IDE), Peripheral Component (PCIE), Interconnect Express (SAS), Serial-attached SCSI (SAS), Serial Advanced Technology Attachment (SATA), and Mobile Industry Processor Interface (MIPI). According to the embodiment, the host interface 341 is an area for exchanging data with the host 320 and may be implemented or driven through firmware called a Host Interface Layer (HIL).

Non-volatile memory express (NVMe) may be a protocol based on a peripheral component interconnect express (PCIe) interface made to improve the performance and design flexibility of the host 320, such as a server or computing device equipped with the non-volatile memory system 310.

Referring to FIG. 17, the ECC 343 in the controller 340 may detect an error bit of data processed in the memory device 350. The CRC system described with reference to FIGS. 1 to 16 may be applied to the ECC 343.

The PMU 344 may monitor power applied to the memory system 310 (e.g., voltage supplied to the controller 340) and provide power to components included in the controller 340. The PMU 344 may detect power on or off, but also generate a trigger signal so that the memory system 310 may urgently back up the current state when the supplied voltage level is unstable. According to the embodiment, the PMU 344 may include a device capable of accumulating power that may be used in an emergency.

The memory interface 345 may transmit/receive signals and data between the controller 340 and the memory device 350 so that the controller 340 controls the memory device 350 in response to a request from the host 320. When the memory device 350 is a flash memory (e.g., a NAND flash memory), the memory interface 345 may include a NAND flash controller (NFC). Under the control of the processor 342, the memory interface 345 may generate a signal for controlling the operation of the memory device 350, receive data output from the memory device 350, or transmit data to be stored in the memory device 350. According to an embodiment, the memory interface 345 supports data input/output between the memory devices 350, and is an area for exchanging data with the memory device 350, and may be implemented or driven through firmware called a Flash Interface Layer (FIL).

The memory 346 is a working memory of the memory system 310 and the controller 340 and may store data necessary for driving the memory system 310 and the controller 340 or data generated during driving. For example, the memory 346 may temporarily store read data provided from the memory device 350 in response to a request from the host 320 before the controller 340 provides the read data to the host 320. Also, the controller 340 may temporarily store the write data provided from the host 320 in the memory 346 before storing the write data in the memory device 350. When operations such as read, write, program, and erase of the memory device 350 are controlled, data transmitted or generated between the controller 340 and the memory device 350 in the memory system 310 may be stored in the memory 346. In addition to read data or write data, the memory 346 may store information (e.g., map data, lead commands, program commands, etc.) required to perform operations, such as writing and reading data between the host 320 and the memory device 350. For example, the write buffer in the memory 346 may temporarily store the write data received from the host 320 until the memory device 350 is programmed, and the read buffer in the memory 346 may temporarily store read data received from the memory device 350 until output to the host 320. Further, the memory 346 may include a command queue, program memory, data memory, write buffer/cache, read buffer/cache, data buffer/cache, map buffer/cache, and the like. Here, the map buffer/cache may be a device or area for storing map information described with reference to FIG. 1.

The processor 342 may control the operation of the controller 340. In response to a write request or a read request from the host 320, the processor 342 may perform a program operation or a read operation on the memory device 350. The processor 342 may drive firmware called a Flash Translation Layer (FTL) to control data input/output operations of the controller 340. According to the embodiment, the processor 342 may be implemented as a microprocessor or a CPU.

The memory device 350 in the memory system 310 may include a plurality of memory blocks 351, 352, and 353. Each of the plurality of memory blocks 351, 352, and 353 includes a plurality of non-volatile memory cells. Although not shown, according to embodiments, each of the plurality of memory blocks 351, 352, and 353 may have a three-dimensional stack structure.

According to embodiments, the memory device 350 may be implemented as a memory device such as Read Only Memory (ROM), Mask ROM (MROM), Programmable ROM (PROM), Erasable ROM (EPROM), Electrically Erasable ROM (EEPROM), Ferromagnetic ROM (FRAM), Phase change RAM (PRAM), Magnetic RAM (MRAM), Resistive RAM (RRAM), NAND or NOR flash memory, Phase Change Random Access Memory (PCRAM), Resistive Random Access Memory (RRAM or ReRAM), Ferroelectrics Random Access Memory (FRAM), Spin Transfer Torque Magnetic Random Access Memory (STT-MRAM), and the like.

While certain example embodiments have been particularly shown and described, it will be understood that various changes in form and details may be made therein without departing from the spirit and scope of the following claims.

What is claimed is:

1. A cyclic redundancy check (CRC) system comprising:
    a data folding processing circuit; and
    a CRC processing circuit,
    wherein the data folding processing circuit comprises:
        a first bit fold circuit configured to fold first input data into first fold data;
        a second bit fold circuit configured to fold second input data into second fold data; and
        a stream fold circuit configured to generate first fold streaming data based on the first fold data and the second fold data, and
    wherein the CRC processing circuit comprises:
        a first flip-flop configured to receive and store first dividend data of a first cycle;
        a second flip-flop configured to receive and store the first fold streaming data of the first cycle; and
        a CRC logic configured to perform a CRC operation on the first dividend data and the first fold streaming data.

2. The CRC system of claim 1, wherein each of the first input data and the second input data is n-bit data,
    wherein each of the first fold data, the second fold data, and the first fold streaming data is m-bit data, and
    wherein n is a natural number, m is a natural number, and n is greater than m.

3. The CRC system of claim 2, wherein the first input data comprises first folding upper input data and first folding lower input data, and
    wherein each of the first folding upper input data and the first folding lower input data is m-bit data.

4. The CRC system of claim 3, wherein the first bit fold circuit is further configured to generate the first fold data by performing an exclusive OR (XOR) operation between same bit positions of the first folding upper input data and the first folding lower input data.

5. The CRC system of claim 1, wherein the stream fold circuit is further configured to generate the first fold streaming data by performing an XOR operation between same bit positions of the first fold data and the second fold data.

6. The CRC system of claim 1, wherein a remainder value obtained by performing the CRC operation on the first fold streaming data and the first dividend data is second dividend data of a second cycle following the first cycle.

7. A cyclic redundancy check (CRC) system comprising:
    a data folding processing circuit;
    a CRC processing circuit; and
    a counter,
    wherein the data folding processing circuit comprises:
        a first bit fold rotation circuit configured to fold first input data into first fold data and rotate a first bit position of the first fold data;
        a second bit fold rotation circuit configured to fold second input data into second fold data and rotates a second bit position of the second fold data; and
        a stream fold circuit configured to generate first fold streaming data, based on the first fold data and the second fold data,
    wherein the CRC processing circuit comprises:
        a first flip-flop configured to receive and store first dividend data of a first cycle;
        a second flip-flop configured to receive and store the first fold streaming data of the first cycle; and
        a CRC logic configured to perform a CRC operation on the first dividend data and the first fold streaming data, and
    wherein the counter is configured to provide a counter signal to the first bit fold rotation circuit and the second bit fold rotation circuit to rotate first bit positions of the first fold data and the second fold data.

8. The CRC system of claim 7, wherein each of the first input data and the second input data is n-bit data,
    wherein each of the first fold data, the second fold data, and the first fold streaming data is m-bit data, and
    wherein n is a natural number, m is a natural number, and n is greater than m.

9. The CRC system of claim 8, wherein the first input data comprises first folding upper input data and first folding lower input data, and
    wherein the first folding upper input data and the first folding lower input data are m-bit data.

10. The CRC system of claim 9, wherein the first bit fold rotation circuit is further configured to rotate a third bit position of the first folding upper input data.

11. The CRC system of claim 9, wherein the first bit fold rotation circuit is further configured to shift a third bit position of the first folding upper input data.

12. The CRC system of claim 9, wherein the first bit fold rotation circuit is further configured to generate the first fold data by performing an exclusive OR (XOR) operation between same second bit positions of the first folding upper input data and the first folding lower input data.

13. The CRC system of claim 7, wherein the stream fold circuit is further configured to generate fold streaming data by performing an XOR operation between same second bit positions of the first fold data and the second fold data.

14. The CRC system of claim 7, wherein the fold streaming data is dividend data, and is a remainder value obtained by performing a CRC operation of first dividend data.

15. A cyclic redundancy check (CRC) method comprising:
    a data folding processing method; and
    a CRC processing method,
    wherein the data folding processing method comprises:
        folding first input data into first fold data;
        folding second input data into second fold data; and
        streaming the first fold data and the second fold data as fold streaming data, and
    wherein the CRC processing method comprises:
        receiving and storing first dividend data;
        receiving and storing the fold streaming data; and
        performing a CRC operation on the first dividend data and the fold streaming data.

16. The CRC method of claim 15, wherein the first input data is n-bit data and the first fold data is m-bit data, and
    wherein n is a natural number, m is a natural number, and n is greater than m.

17. The CRC method of claim 16, wherein the first input data comprises upper first input data and lower first input data, and
    wherein the upper first input data is n-m bit data, and the lower first input data is m bit data.

18. The CRC method of claim 17, wherein the folding of the first input data into the first fold data comprises performing an exclusive OR (XOR) operation between same bit positions of the upper first input data and the lower first input data.

19. The CRC method of claim 15, wherein the streaming of the first fold data and the second fold data as the fold streaming data comprises generating the fold streaming data by performing an XOR operation between same bit positions of the first fold data and the second fold data.

20. The CRC method of claim 15, wherein the fold streaming data is dividend data, and
wherein the CRC method further comprises generating, as the dividend data, a result of an XOR operation on a remainder value obtained by performing the CRC operation on the first dividend data and the fold streaming data.

* * * * *